(12) United States Patent
Brandelli

(10) Patent No.: US 9,631,351 B2
(45) Date of Patent: Apr. 25, 2017

(54) HYDRAULIC VALVE ADAPTER

(71) Applicant: Anthony R. Brandelli, Lomita, CA (US)

(72) Inventor: Anthony R. Brandelli, Lomita, CA (US)

(*) Notice: Subject to any disclaimer, the term of this patent is extended or adjusted under 35 U.S.C. 154(b) by 0 days.

(21) Appl. No.: 15/231,599

(22) Filed: Aug. 8, 2016

(65) Prior Publication Data

US 2016/0340880 A1    Nov. 24, 2016

Related U.S. Application Data

(60) Continuation-in-part of application No. 15/182,479, filed on Jun. 14, 2016, which is a continuation-in-part of application No. 14/935,147, filed on Nov. 6, 2015, which is a division of application No. 14/479,535, filed on Sep. 8, 2014, now Pat. No. 9,260,848.

(51) Int. Cl.
| | |
|---|---|
| *E03D 1/33* | (2006.01) |
| *E03D 1/32* | (2006.01) |
| *G05D 9/02* | (2006.01) |
| *F16K 31/18* | (2006.01) |
| *E03D 1/36* | (2006.01) |
| *F16K 31/126* | (2006.01) |

(52) U.S. Cl.
CPC ............... *E03D 1/33* (2013.01); *E03D 1/32* (2013.01); *E03D 1/36* (2013.01); *F16K 31/126* (2013.01); *F16K 31/18* (2013.01); *G05D 9/02* (2013.01)

(58) Field of Classification Search
CPC .... E03D 1/33; E03D 1/36; E03D 1/32; F16K 31/18; G05D 9/02

USPC .... 137/430, 432, 451, 414, 442, 444; 4/415; 73/315

See application file for complete search history.

(56) References Cited

U.S. PATENT DOCUMENTS

| | | |
|---|---|---|
| 265,709 A | 10/1882 | Sniffed |
| 746,715 A | 12/1903 | Lindsay |
| 1,893,859 A | 10/1930 | Gleason |
| 2,841,169 A | 7/1958 | Martin et al. |
| 3,296,630 A | 1/1967 | Clark |
| 4,100,928 A | 7/1978 | Schoepe |
| 4,182,364 A | 1/1980 | Antunez et al. |
| 4,562,859 A | 1/1986 | Shames et al. |
| 4,843,657 A | 7/1989 | Orr |
| 4,901,377 A | 2/1990 | Weir |
| 5,211,204 A * | 5/1993 | Mikol ............ E03D 1/144 137/410 |
| 5,327,931 A | 7/1994 | Royalty et al. |

(Continued)

FOREIGN PATENT DOCUMENTS

GB          488402 A        7/1938

*Primary Examiner* — Craig Schneider
*Assistant Examiner* — Nicole Wentlandt
(74) *Attorney, Agent, or Firm* — Fulwider Patton LLP

(57) ABSTRACT

A tube device including concentric inner and outer tubes to form an annulus to receive an upright stem in a toilet tank and adjustable relative to the stem. A keeper limits travel of a float to prevent opening of a control valve absent flushing of the toilet. In one aspect, the present invention includes an elongated catch device pivotally mounted intermediately to an inlet tube device and carrying at its upper extremity a keeper selectively disposed in the path of a float device to, unless a toilet has been flushed, block lowering of the float device and consequent opening of the control valve.

6 Claims, 22 Drawing Sheets

(56) References Cited

U.S. PATENT DOCUMENTS

| | | |
|---|---|---|
| 5,551,466 A | 9/1996 | De Pieri |
| 5,904,176 A | 5/1999 | Li |
| 6,450,195 B1 | 9/2002 | Gil |
| 6,510,866 B2 | 1/2003 | Li |
| 6,712,090 B1 | 3/2004 | Brandelli |
| 6,837,264 B1 | 1/2005 | Schuster |
| 6,913,035 B2 | 7/2005 | Huang |
| 8,132,273 B2 | 3/2012 | Bouchard |

* cited by examiner

HYDRAULIC VALVE ADAPTER

CROSS REFERENCE TO RELATED APPLICATION

This application is a continuation-in-part of co-pending U.S. application Ser. No. 15/182,479 filed Jun. 14, 2016, which is a continuation-in-part of co-pending U.S. application Ser. No. 14/935,147 filed Nov. 6, 2015, which is a divisional of U.S. application Ser. No. 14/479,535 filed Sep. 8, 2014, which issued as U.S. Pat. No. 9,260,848 on Feb. 16, 2016, all of which are incorporated by reference herein.

BACKGROUND

The present invention relates to hydraulic valves and more particularly to valves typically utilized to control fluid flow in a toilet tank.

DESCRIPTION OF THE PRIOR ART

Hydraulic valves have long been employed to control flow of liquid such as in a toilet tank. These valves often rely on buoyant floats for actuation to turn the incoming water off when the water reaches a predetermined level and to turn the water back on when a flush handle has been actuated to exhaust the fluid from the tank into the toilet bowl. An example of these types of valves and arrangements is shown my U.S. Pat. No. 6,712,090.

Many efforts have been made over the years to improve the construction of these valves, often referred to as ball cock valves, and even to lock the valves against opening except when a toilet has been flushed, to thereby guard against a malfunction of the control valve resulting in extended periods of continuous water flow through the tank.

While a number of valve shutoff devices have been proposed to limit opening of the control valve or the period of time for which it is open, none have gained commercial acceptance. It is believed that one such device proposed by Fluidmaster, Inc. proved so impractical that it was taken off the market and is no longer available.

In recognition of the need, another effort to solve the problem is shown in U.S. Pat. No. 4,843,657 to Orr. That device includes octagonal legs carried from a pivot seeking to selectively align a stop on the vertical leg under the edge of a tubular float to selectively block downward travel thereof. As will be apparent to those of skill in the art, that device would require some degree of force to operate, thus requiring a greater force on the flush lever for operation, would require some degree of skill to install, and would be of questionable reliability.

Turning now to the construction of the control valve itself, as disclosed in my prior patent U.S. Pat. No. 6,712,090, existing ball cock valves, in some instances, incorporate a valve body which sits on an upright supply pipe to control flow from the outlet at the top of the pipe via a flexible diaphragm which may be raised and lowered to open and close such outlet. It has been common practice for such diaphragms to incorporate a central vertical pilot passage which receives a vertically elongated pilot pin or stem having longitudinally spaced apart, diametrically enlarged cross sections spaced for selective registration with respective reduced-in diameter ports spaced along the length of the pilot passage for selectively blocking flow through the annulus formed between such enlarged cross sections and ports. When the enlarged sections are out of registration with the respective ports, water may flow upwardly through the pilot passage to pressurize the topside of the diaphragm to force it down into engagement with a seat formed at the pipe outlet to thereby block flow. A lever arm is pivotally mounted at one end to engage the pilot pin medially for raising and lowering of the pilot pin in response to raising and lowering of a donut shaped float mounted concentrically about the feed pipe to selectively control flow through the pilot passage.

While a significant improvement over the art at the time, this prior construction can sometimes suffer the shortcoming that stopping of flow through the pilot passage is dependent on registration of the enlarged sections with the respective ports and, over time, one or the other may be damaged or worn to the point where positive registration for control of flow is no longer effective. Further, the annuli between the pilot pin and ports in the passage provides for direct flow from the inlet pipe into the pilot passage and, with the relatively low volume of flow which can carry sediment, scum or residue, the annuli may become plugged or clogged.

Another example of a pilot valve construction for a ball cock assembly is a pilot pin carried from one end of a lever arm mounted pivotally to a pivot pin and projecting through an aperture in a seal element to be formed on its lower extremity with an enlarged bulbous portion apparently intended to be, when the valve is closed, engaged with the lower surface of the seal element to block flow therethrough. A device of this type, while in theory providing for some degree of control for the seal to close off the water inlet, fails to provide for positive exhausting of fluid above the seal element in a manner which will result in positively releasing pressure above the seal element for raising thereof and, further, fails to provide for diverting the water during inlet flow in a positive manner to direct any sediment in such water away from the central underside of the seal element in a manner which will serve to minimize the tendency for such sediment to be directed into the pilot passage.

One well known commercially available ball cock valve is marketed by Fluidmaster Inc. of San Juan Capistrano, Calif. under the mark FLUIDMASTER®. Systems employing valves of this type, while popular in the marketplace, often incorporate a great number of parts, in some instances over 40, thus making them expensive to manufacture and requiring some degree of skill to assemble and install, particularly in tight quarters, such as near the corner of a toilet tank.

A repair kit sold under the FLUIDMASTER® mark, Part #400CRP14, includes an upright stem mounted to the bottom wall of the toilet tank for telescopical receipt of a female tube mounting a flow tank valve controlled by a donut-shaped float received telescopically over the tube to float up and down with the level of water in the tank. The adapter device of the present invention is particularly adapted to mount to such a stem to carry my vertically elongated catch device constructed to hold a flow valve closed unless the toilet has been flushed.

SUMMARY OF THE INVENTION

A retrofit hydraulic flow control adapter apparatus for mounting to an upstanding toilet tank inlet pipe having an upwardly projecting stem, including a master tube telescoped over the stem, and mounting a control valve in the upper extremity thereof, and a lock mechanism for locking the position of the master pipe relative to the stem.

BRIEF DESCRIPTION OF THE DRAWINGS

FIG. 1 A is a partial perspective view, in enlarged scale, of the upper portion of a control tube included in the catch device shown in FIG. 1 and depicting the control valve being installed;

FIG. 1 B is a perspective view similar to 1 A but showing the control valve fully installed;

DETAILED DESCRIPTION OF THE PREFERRED EMBODIMENTS

Figure 4:
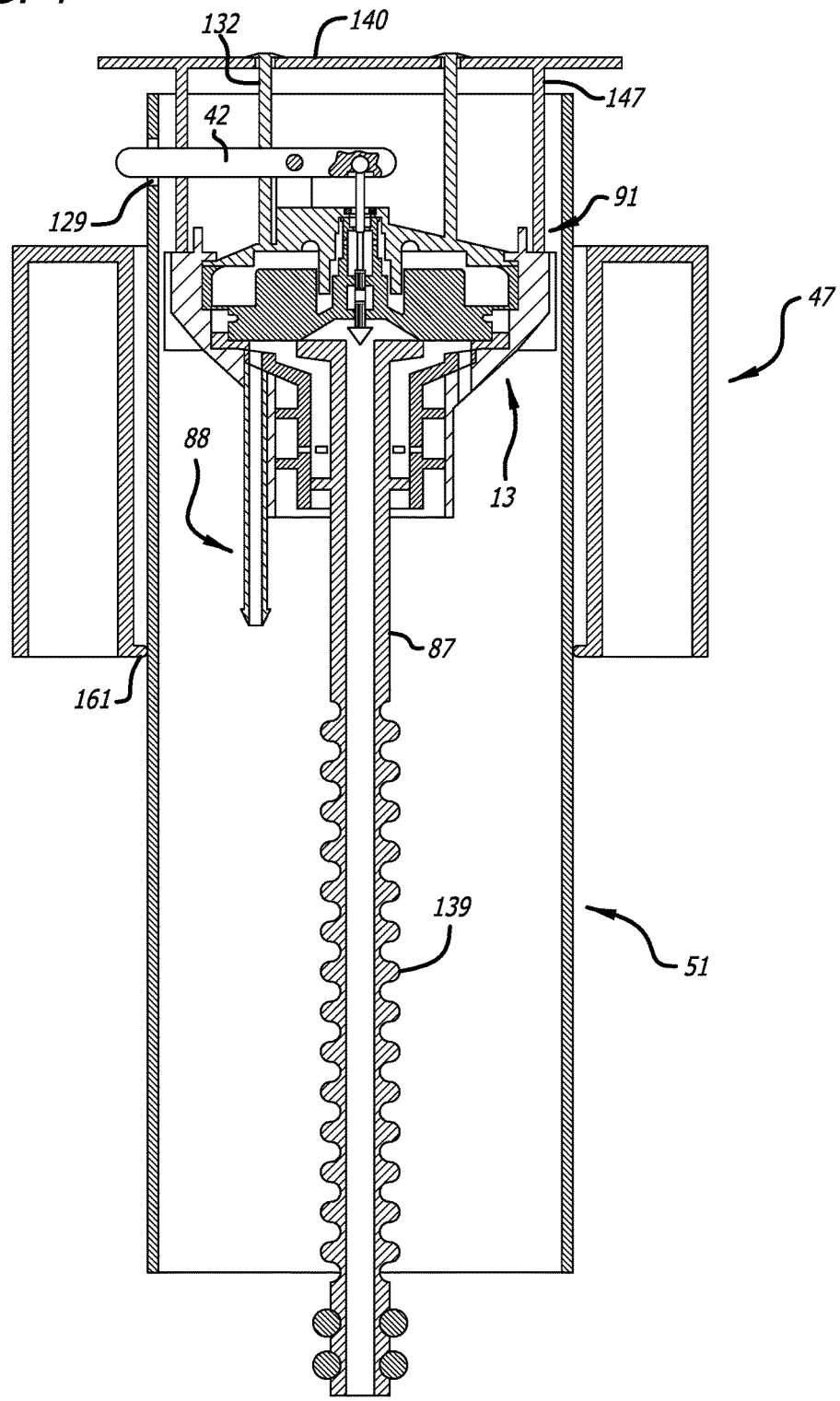
FIG. 4 is a vertical, sectional view, in enlarged scale, of the upper portion of the flow control valve shown in FIG. 3.

Referring to FIG. 4, in one embodiment of the present invention a control valve 13 has utility for mounting on top of an upright adjustable inlet pipe device 15 which includes an outlet 17 surrounded by an upwardly facing valve seat 19 (FIGS. 6 and 7) against which a diaphragm 20 will seat when a pilot valve 23 is opened. The diaphragm 20 is formed with a central structure defining an axial pilot stem passage 26 (FIG. 7) formed with a pair of reduced-in-diameter, vertically spaced apart ports 27 and 29 with which respective enlarged portions 33 and 35 of a valve stem 37 are selectively registered. The passage terminates at its bottom end in an inlet port surrounded by a downwardly facing pilot valve seat 28. The valve stem 37 projects downwardly below the port pilot seat 28 (FIG. 7) and is formed with an enlarged poppet 41 configured in its lower portion with downwardly facing upwardly and radially outwardly angled deflecting surfaces 60, (FIG. 7) to deflect upwardly flowing, incoming water to flow radially outwardly as it passes the poppet. The stem 37 is controlled by a control lever 42 having a projecting extremity 43 controlled by a concentrically disposed cylindrical control tube 51 encircled and carried, by a donut shaped float 47.

Figure 7:
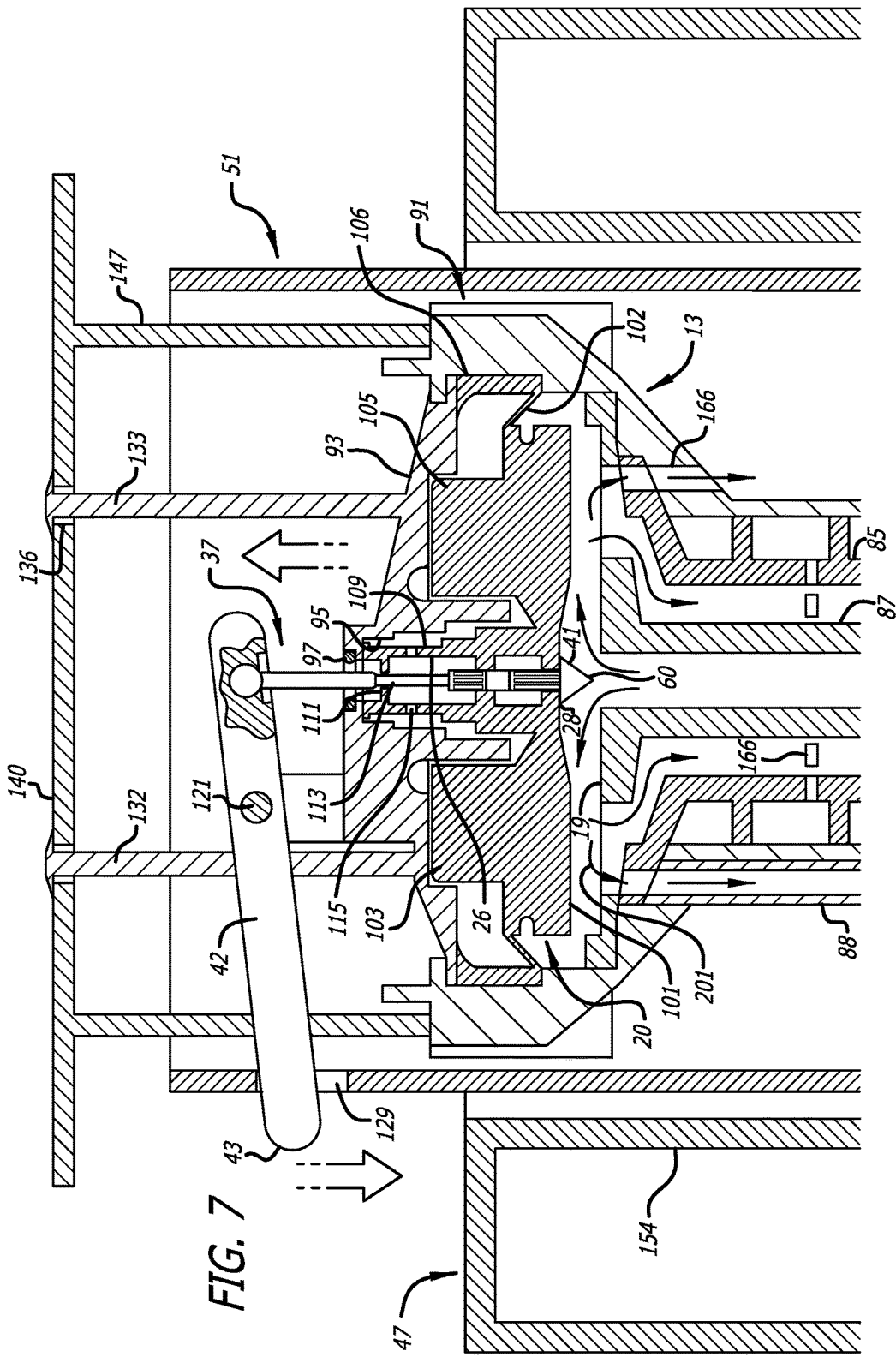
FIG. 7 is a vertical, sectional view similar to FIG. 6 but showing the flow control valve in its open position.

Thus, when the float 47 is lowered, the projecting extremity 43 of the lever arm 42 will be lowered thereby raising the pilot stem 37 to raise the poppet 41 to seat against the seat 28 on the underside of the diaphragm 20 (FIG. 7) to block flow of water upwardly through the passage 26 to thereby allow for pressurization of the underside of the diaphragm as shown in FIG. 7 to raise the diaphragm off its seat 19 thereby allowing flow of water up through the passage 87 defined by the upper extremity of the pipe device to flow outwardly into the toilet tank and bowl as will be described below.

Figure 1:
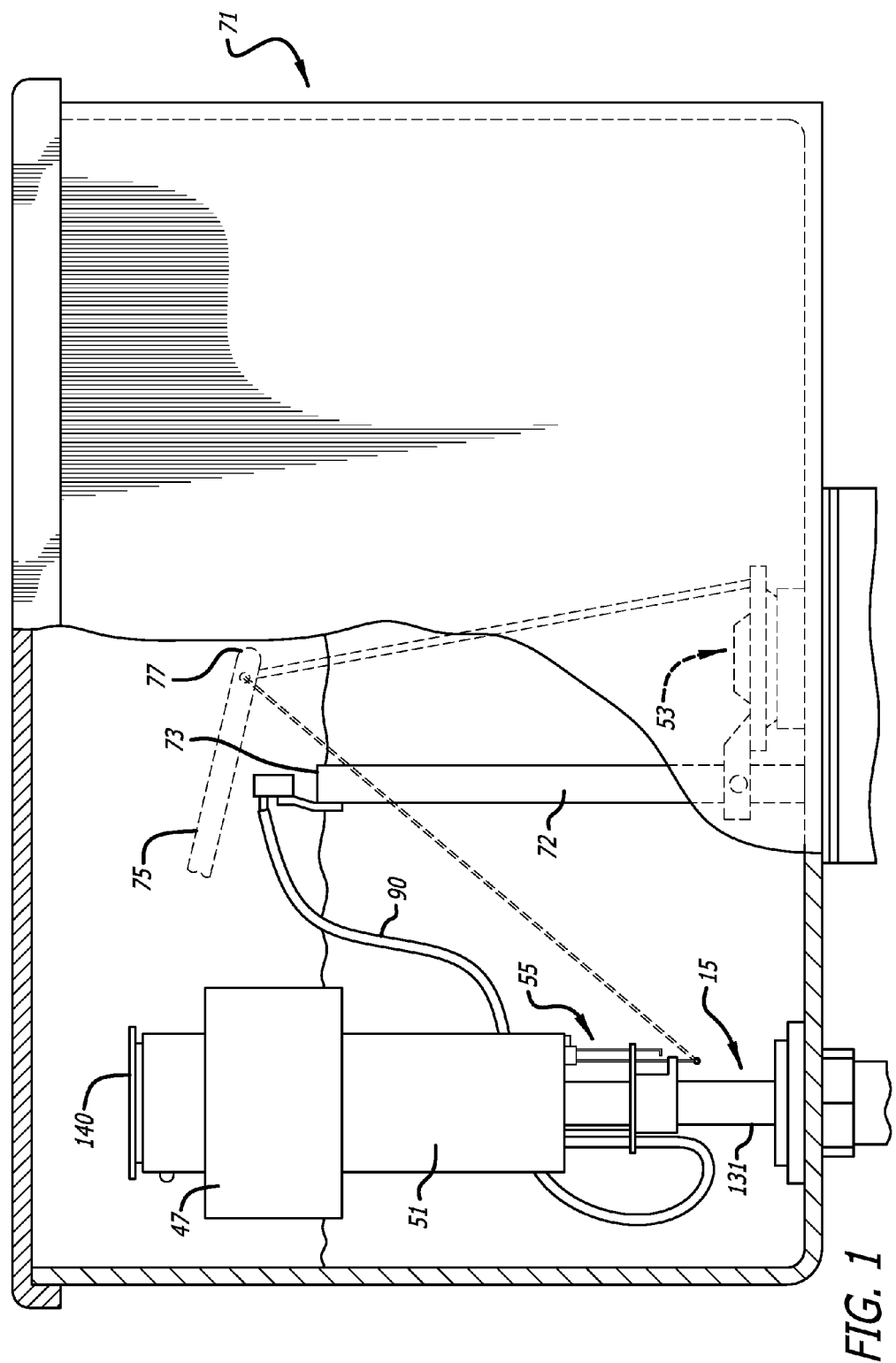
FIG. 1 is a front view, partially broken away, of a toilet storage tank which incorporates an improved flow control valve which may be incorporated in the present invention.

As will be appreciated by those of skill, lowering of the float may be selectively restricted to prevent the pilot valve 23 from opening the control valve 13. Referring to FIG. 1, control of the pilot valve 23 to control flow from the inlet pipe device 15 may be via the concentric control tube 51. The inlet pipe device is typically disposed spaced laterally from a flapper flush valve 53.

Figure 8:
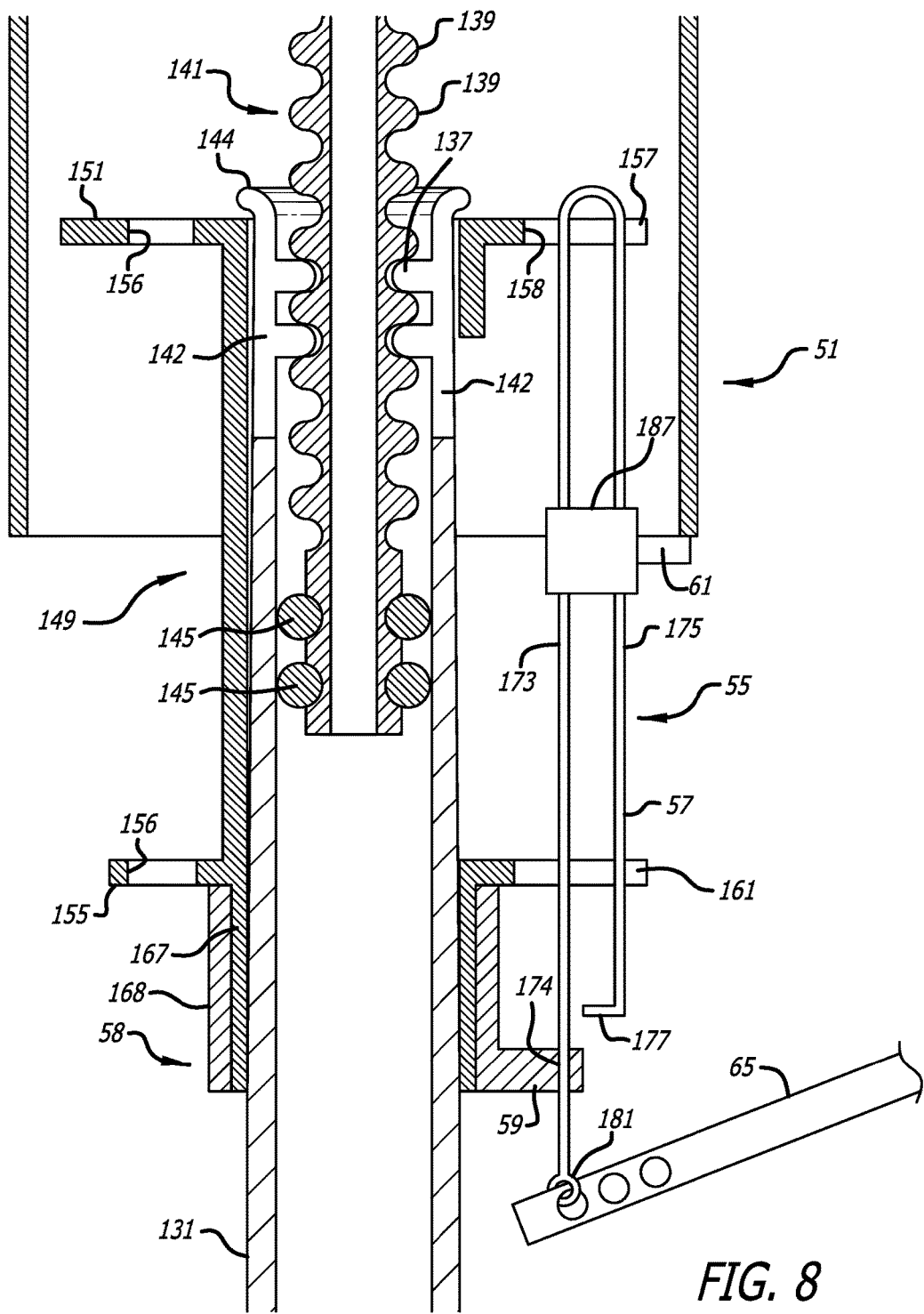
FIG. 8 is a vertical, sectional view, in enlarged scale, of the catch device shown in FIG. 3 and depicting a catch device blocking downward travel of a float tube device controlling the control valve shown in FIG. 7.

Referring to FIG. 8, a catch device, generally designated 55, is disposed on the side of the fill pipe facing the flush valve and, in the preferred embodiment, is formed by a generally hairpin shaped somewhat stiff but resilient spring wire 57 mounted medially from a mount device 58 which may include a radially projecting hinge arm 59 constructed of elastomeric material such as flexible rubber to provide for rocking or slight rotation of such catch device about the arm. Carried at the upper extremity of the catch device is a keeper 61 to be selectively disposed in the downward path of the control tube 51 to block the downward path thereof (FIG. 8). The lower extremity of the catch device 55 is connected with the flush control lever 75 by means of a link 65 such that, when the flush control lever is actuated, the catch device is rotated a few degrees counterclockwise on the hinge arm 59, as viewed in FIGS. 1 and 9, to move the keeper 61 to the left out from under the bottom edge of the control tube 51 thereby freeing the tube to lower as the water in the tank is lowered to thereby rotate the lever arm 42 counterclockwise as viewed in FIG. 7 to open the flow control valve 13. Concurrently, the lever arm will lift the free side of the flapper valve 53 to flush the water from the tank into the bowl.

Figure 6:
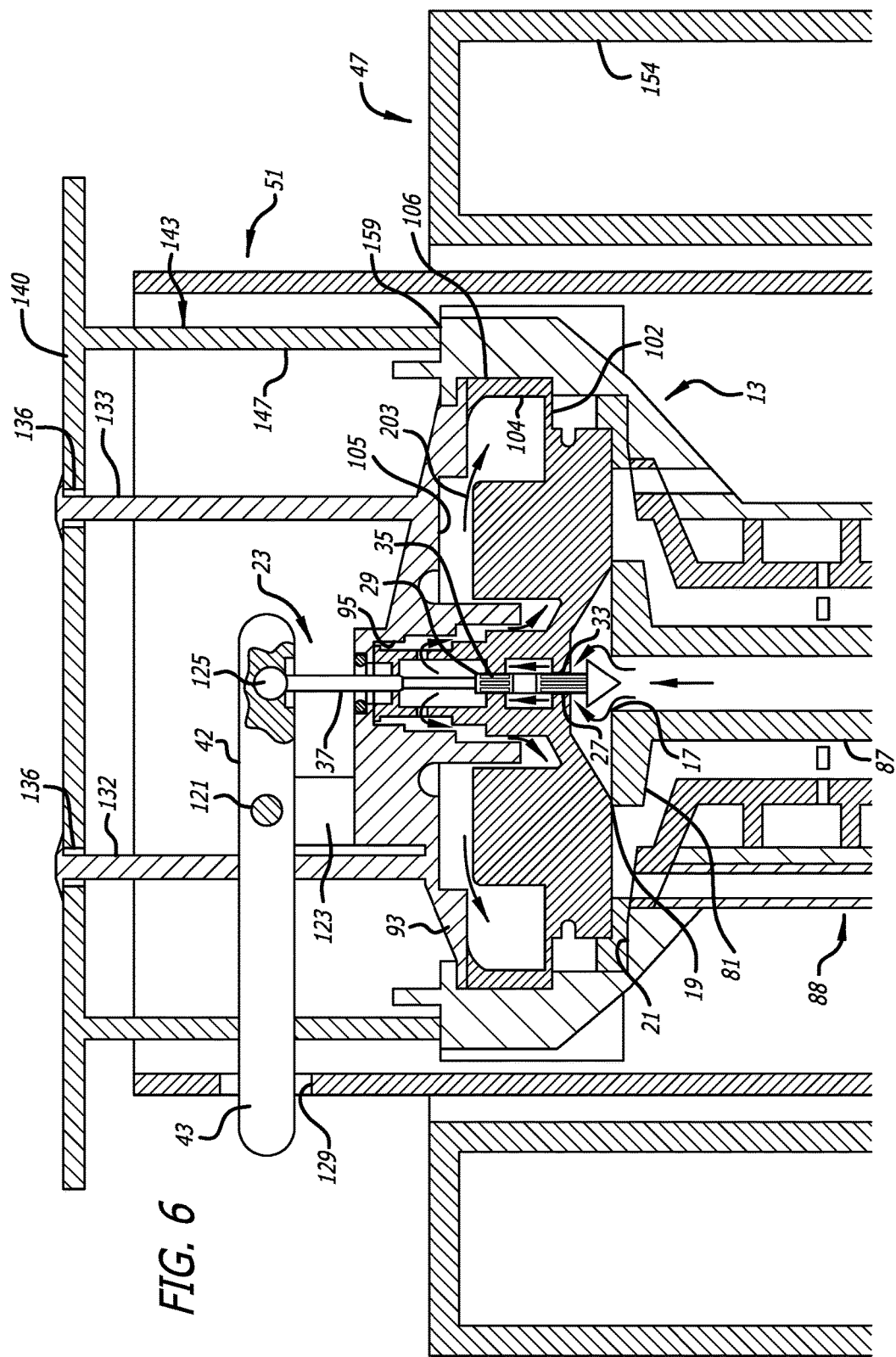
FIG. 6 is a partial vertical sectional view, in enlarged scale and partially broken away, of the flow control valve shown in FIG. 4 and depicting the valve in its closed position.

On the other hand, should the water level in the tank 71 be lowered, by a leak, from the level shown in FIG. 1 without actuation of the flush lever, the keeper 61 will remain positioned in the path of the control tube 51 (FIG. 8) to prevent lowering thereof to retain the pilot valve 23 open and the flow control valve closed (FIG. 6).

In some embodiments the spring wire is slightly corrugated on at least one leg to provide miniature saw teeth mating with similar corrugations on the edge of the slot in the slider so that when adjustment is made in the height of the slider without compressing the legs 173 and 175 of the wire together, the mating teeth will somewhat resist longitudinal travel of the slider so as to maintain the vertical adjustment on the corrugated leg.

Referring to FIGS. 1 A and 1 B, the control tube 51 may be constructed of plastic and the upper extremity thereof formed at one diametrical side with a pair of annularly spaced apart, longitudinal slits 126 defining there-between a narrow, upwardly projecting resilient tongue 128 formed at its free extremity with the bore 129. In this manner, when the control valve is installed, the distal extremity 43 of lever arm 42 will ride downwardly on the inner surface of the free extremity of the tongue 128 to drive the free end radially outwardly, as it is viewed in FIG. 1 A, until the bore 129 is registered with the lever arm for projection into such bore as shown in FIG. 1 B allowing the tongue to snap back into its neutral position.

Toilet tanks 71 typically incorporate an upstanding inlet pipe or stem and an upstanding overflow pipe 72 (FIG. 1). The overflow pipe is formed on its top end 73 for when the water reaches a certain level, allow escape of the water thereby preventing overflow of the water from the tank. Overflow pipes of the type of the pipe 72 typically incorporate a network of water channels leading to the toilet bowl for replenishing bowl water after a flush.

With continued reference to FIG. 1, such toilet tanks also typically incorporate an actuation knob or lever which might actuate a flush lever 75 to rotate a free end 77 between a lowered fill position and a raised flush position.

Figure 2:
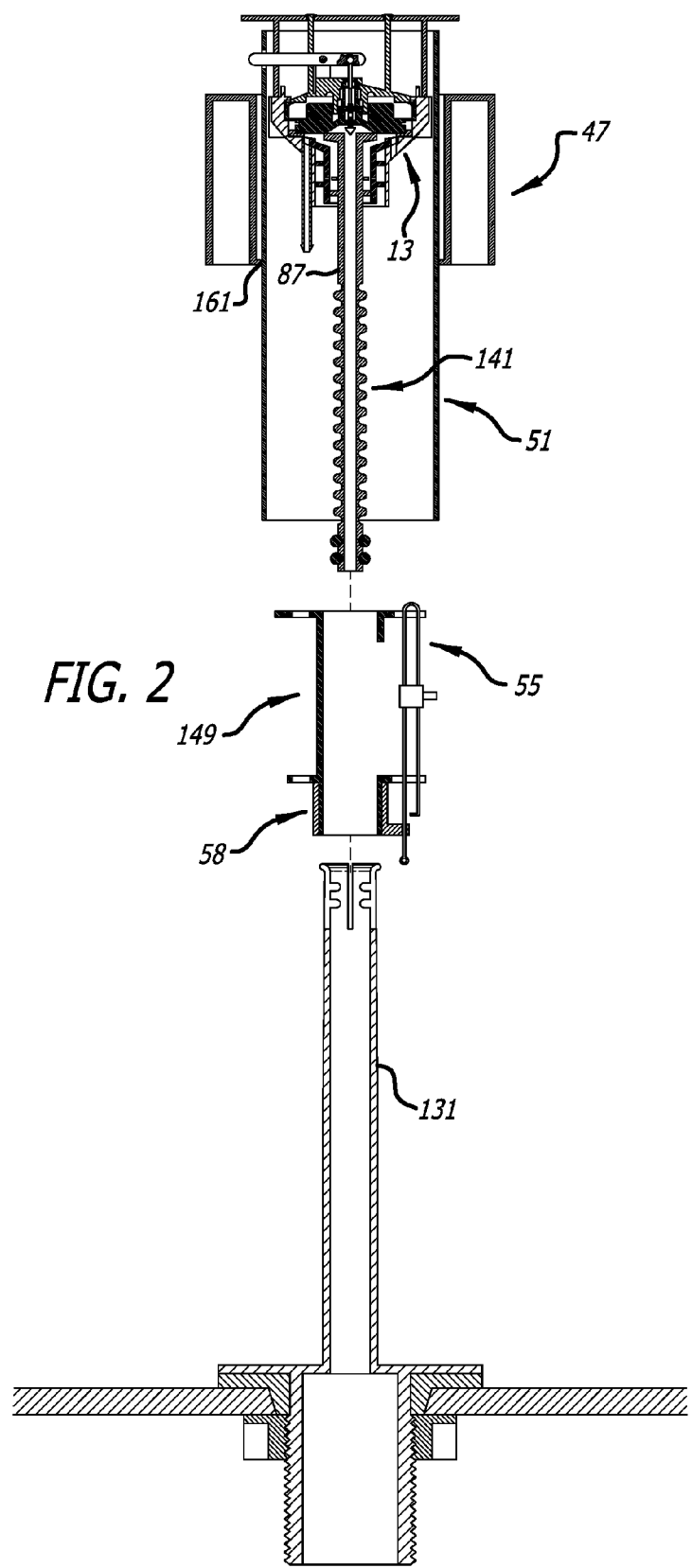
FIG. 2 is an exploded, vertical, sectional view, in enlarged scale, of an inlet pipe device and the control valve shown in FIG. 1.
Figure 3:
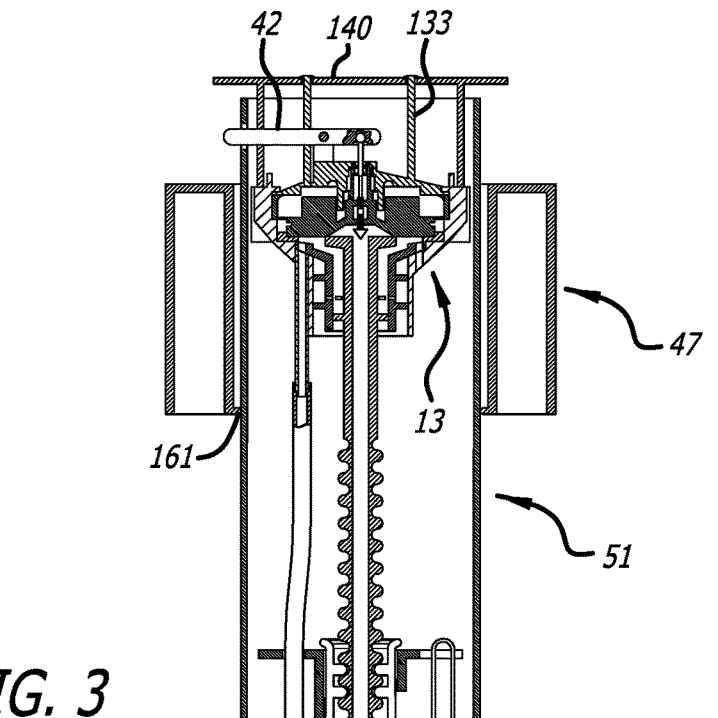
FIG. 3 is a vertical, sectional view similar to FIG. 2 but in enlarged scale and the components assembled.

Referring to FIGS. 3 and 2, the inlet pipe device 15 includes an inlet pipe 131 typically connected through the bottom wall of the tank 71 and an upper adjustment pipe 141 telescoped downwardly therein. The pipe 141 is formed on its upper extremity 87 with a radially enlarged flange 81 constructed with an upwardly facing annular surface defining the control valve seat 19.

The control valve device 13 includes a tubular housing, generally designated 91, formed on its periphery with longitudinal guide ribs spaced equidistant annularly around the housing to provide a generally annular siphon break space between the housing and the control tube 51. The lower portion of the housing is configured in part, by an interior annular flange and an exterior connector flange 21 (FIG. 6). The housing is further formed with an annular top wall 93 (FIG. 6). The top wall is formed centrally with a downwardly projecting cylindrical shell defining a central, stepped, vertical bore 95 which, in the upward direction, progressively reduces in diameter to terminate at its upper extremity in an upwardly opening O-ring gland for receipt of an O-ring 97 (FIG. 7).

The diaphragm is then formed centrally with a upstanding, stepped tower 109 received complimentary in the stepped bore 95 and configured centrally with the pilot passage 26. The tower is further configured at the upper extremity with an annular flange 111 receiving a reduced-in-diameter neck 113 of the stem.

The tower 109 is formed with a plurality of radially, outwardly opening bleed passages 115 for selectively bleeding fluid from the pilot passage 26 when the pilot valve is open.

In one preferred embodiment, the lever arm 42 is pivotally mounted on a pivot pin 121 carried from a yoke 123 standing up from the top side of the housing 93. Referring to FIG. 6, the right hand end of the lever arm includes a ball socket couple with a ball 125 formed at the upper extremity of the stem 37.

Referring to FIGS. 4, 6 and 7, a pair of posts 132 and 133 stand up from the top of the housing 93 and project through spaced apart bores 136 in a top wall 140 of a cap 143 having an annular, downwardly projecting skirt 147 sitting on an annular flange 159 formed about the periphery of the valve housing.

As noted above, in one preferred embodiment, a donut shaped buoyant float 47 is telescoped over the control tube. The float is configured with an annular air chamber 154 and is formed on its interior diameter with one or more friction devices such a rib 161 (FIG. 3) to form an interference fit with the exterior wall of the control tube 51 to releasably hold the float in position along the vertical length of such tube and may adjust vertically and horizontally.

Referring to FIGS. 1, 3 and 4 the valve housing is conveniently formed with a downwardly depending nipple 88 which is connected on its lower extremity with a fill tube 90 leading to the top end of the overflow pipe 72 for filling the bowl.

The diaphragm 20 is typically constructed of elastomeric material and includes a central body having a downwardly facing sealing surface 101 (FIG. 7) to seat against the seat 19. The diaphragm is concentrically formed about its periphery with an annular, flexible web 102 carrying the body from an anchor ring 104 trapped in an annular channel 106 formed between the top and bottom walls of the housing. The body incorporates a upwardly projecting, concentric rim 103 received in an annular clearance groove 105 formed in the underside of the top wall 93.

It will be appreciated by those skilled in the art that the poppet 41 is enlarged in diameter and is preferably formed on its bottom side with upwardly and outwardly angled deflecting surfaces 60. This serves to, when the valve is open or closing, deflect upwardly flowing water radially outwardly to then flow back radially inwardly under the seat 28 and upwardly into the annulus formed in the passage 26.

Figure 5:
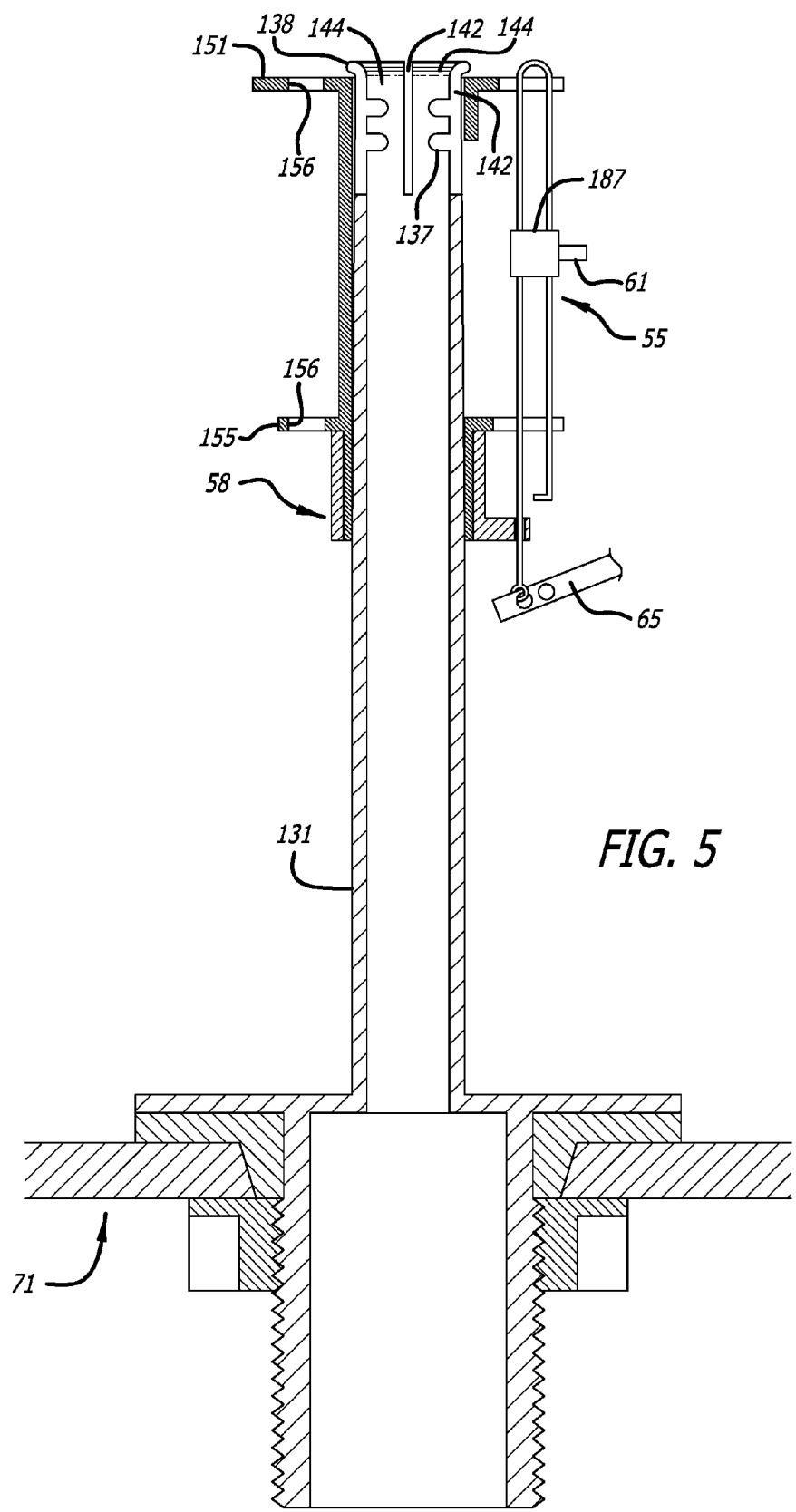
FIG. 5 is a vertical, sectional view, in enlarged scale, of the lower portion of the inlet pipe device shown in FIGS. 2 & 3.

Turning now back to FIGS. 5 and 8, the fill pipe device 15 includes upper and lower pipes 141 and 131 respectively. The lower fill adjustment pipe 131 is configured in its upper extremity with a pair of interior annular ribs 137 formed to receive in overlapping radial relationship corresponding pairs of annular ribs 139 spaced along the exterior of the upper master pipe 141. The upper pipe is telescoped the desired distance downwardly into the lower pipe for selective registration of the ribs 137 in respective grooves formed between the ribs 139 on the upper tube 141.

Figure 10:
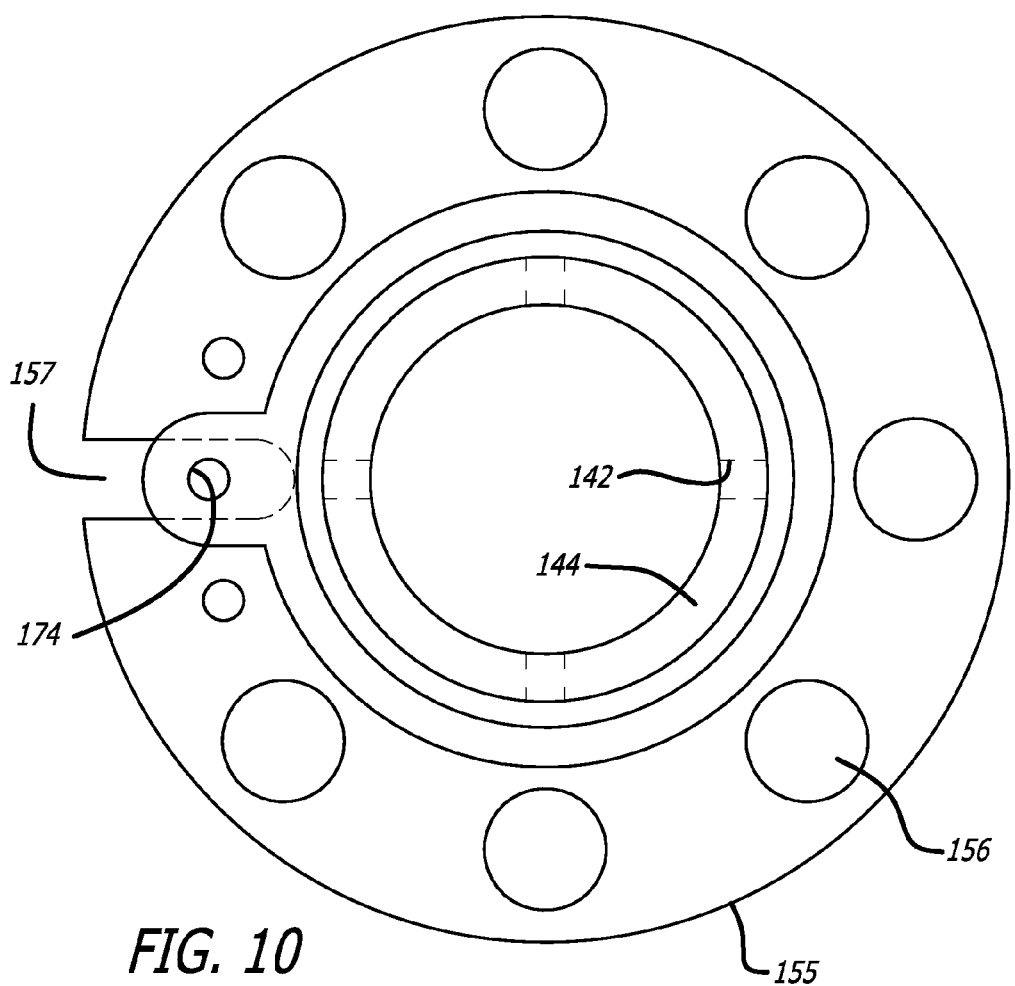
FIG. 10 is a transverse, sectional view, in enlarged scale, of a locking flange incorporated in the catch mechanism shown in FIG. 9.

Referring to FIGS. 8 and 10, the upper extremity of the lower pipe 131 is configured with four longitudinal, upwardly opening slots 142 spaced equidistant about the periphery to form four resilient, upstanding, cantilevered fingers 144 disposed in respective quadrants. As will be appreciated, each finger is formed at its upper extremity with a respective segment of the radially, inwardly projecting ribs 137. Consequently, I provide a snap in feature facilitated by outwardly flared flange segments defining respective lips 138 at the upper extremities of the fingers having, when the fingers are in their relaxed position, a combined maximum outside diameter larger than the inside diameter at the top of the fitting flange 149.

Formed in the lower extremity of the upper pipe 141 are a pair of O-ring grooves for receipt of O-rings 145 for sealing against the interior of the lower pipe 131 and stabilizing the connection between those pipes.

With continued reference to FIG. 8, a spool shaped lock fitting, generally designated 149, is received in telescopical relationship over the upper extremity of the lower pipe 131 and is formed with upper and lower radial flanges 151 and 155.

As mentioned, in one preferred embodiment, the fitting 149 is formed with an upwardly narrowing tapered interior diameter sized to be dropped down over the upper extremity of the lower pipe 131 during assembly to leave a concentric annulus between the pipe 131 and such inside diameter as shown in FIG. 8 for free rotation of the fitting on such pipe. In any event, as the fitting is brought into position, the upper end will compress the upper ends of the fingers 144 in each quadrant radially inwardly to the point where the rib segments 137 will be diminished in their respective combined diameters to allow for relative longitudinal shifting to align with a selected groove formed between the ribs 139 to, upon release, register in the groove to lock the fill pipe device at the desired height. The fitting will thus be dropped down to the level where the lip segments will be disposed above the top of the fitting 149 to thus block the fitting from shifting upwardly, as for instance, under the force of the link 65 being drawn upwardly to the right during flush (FIG. 5).

The flanges 151 and 155 (FIGS. 8 and 10) are configured with a plurality of through, vertical bores 156, respectively, spaced equidistant thereabout for receipt of the tube 90. The flanges are further formed on their respective one sides with diametrical, outwardly opening clearance slots 157 for receipt of the catch device 55 and to act as a radial guide. The closed end of the slot in the upper flange acts as a stop 158 to limit counter clockwise rotation of the catch device.

With continued reference to FIG. 8, conveniently, the fitting 149 is further formed below the flange 155 with a downwardly projecting annular skirt 167. The mount device 58 is conveniently formed with an elastomeric ring 168 to be telescoped over the skirt 167. The ring is formed in its lower extremity with the radially, outwardly projecting, flexible hinge arm 59. The hinge arm 59 is formed with a through vertical bore 174 for frictional receipt of one leg 173 of the catch device 55. The other leg 175 of the catch device 55 is constructed of spring wire to project parallel to the leg 173 and cooperate in mounting the slider 187. The leg 175 is formed at its lower extremity with a orthogonal tab 177 which, in the preferred embodiment, is turned radially inwardly toward the first leg 173 to terminate in an end spaced therefrom. In some embodiments, the tab 177 is turned radially outwardly so that the catch device can be mounted via that tab. As will be apparent to those skilled in the art, some embodiments do not include such a tab 177. A U-shaped slider 187, formed with bores and maintaining a keeper 61, may be telescoped over the parallel legs 173 and 175.

In the preferred embodiment, the leg 173 projects below the hinge arm 59 to define a lever arm formed with an eye 181 connected with the link 65. As will be appreciated by those skilled in the art, the link 65 may take many different forms such as a chain, rigid link, coil spring or even an elastomeric strip.

The slider 187 is configured with a pair of horizontally spaced apart vertical bores into which spring wire legs 173 and 175 are friction fit for slidable adjustment of the slider 187 to the desired elevation on the catch device. As will be appreciated, such bores may merely be in the form of a single transverse, through slot, vertically receiving such legs at the opposite sides thereof.

In operation, it will be appreciated that the subject device can easily be installed in a conventional toilet tank 71 and the vertical adjustment made for the vertical profile of the tank and desired water level. Hence, when the water valve under the tank is opened, the water will flow upwardly through the inlet pipe device 15 through the upper tube 87 to pressurize under the diaphragm as shown in FIG. 7 thereby raising the diaphragm off its seat 19 allowing water to flow upwardly and radially outwardly under the diaphragm as indicated by the directional arrows 201 (FIG. 7) to flow downwardly through the passages 166 into the tank 71 to fill such tank with water will also flow downwardly through the nipple 88, through the tube 90 to the overflow pipe 72 to fill the toilet bowl. As the water level in the tank rises, the float 47 will be raised causing it to raise the control tube 51 thereby raising the free end 43 of the control lever arm 42 as shown in FIG. 6 to rotate such lever arm clockwise about its pivot pin 121 to drive the stem 37 downwardly. This will then lower the poppet 41 downwardly from its seat 28 to enable flow about such poppet and upwardly through the fluted grooves in the enlarged sections 33 and 35 and upwardly in the tower to flow radially inwardly through the bleed ports 115 to flow downwardly in the tower and radially outwardly above the top of the diaphragm 20 as indicated by the directional arrows 203 (FIG. 6) to pressurize the top side of such diaphragm driving it downwardly to seat on the seat 19 and block further escape of incoming water from the upper tube 87 thereby serving to maintain the water in the tank 71 at the desired level.

Figure 9:
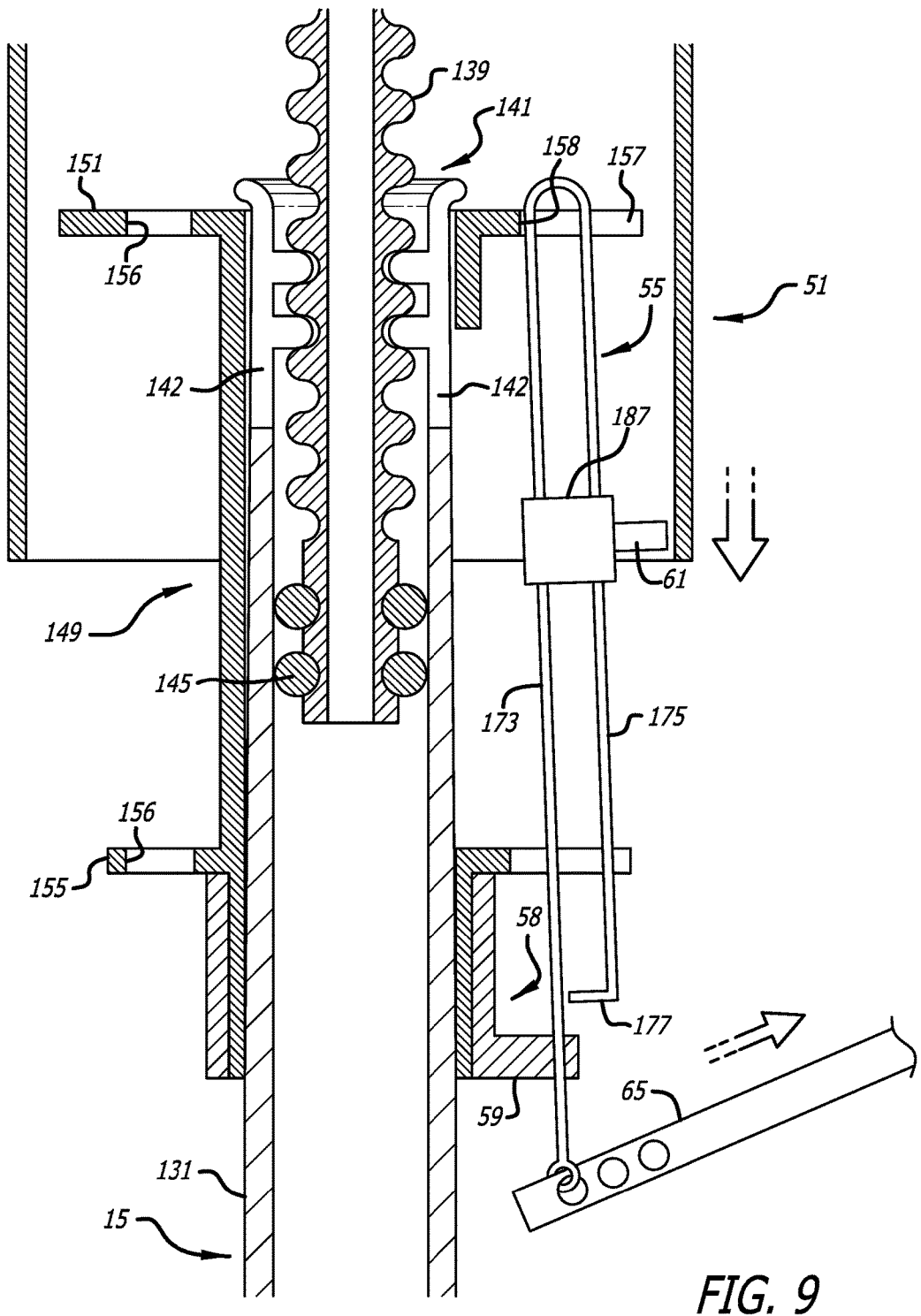
FIG. 9 is a vertical, sectional view, similar to FIG. 8 but showing the catch device released.

Concurrently, as the control tube 51 is raised by elevation of the float 47 the bottom edge thereof will clear the elevation of the keeper 61 allowing the bias of the hinge arm 59 to rotate the catch device 55 clockwise about such hinge arm, as viewed in FIGS. 8 and 9, to drive the keeper 61 radially outwardly under the wall of the tube 51 to block the downward path of such tube until such time as the toilet is flushed again.

As will be appreciated by those skilled in the art, water in the tank 71 will thus remain at the desired level prepared for the next flush. In the event, however, that water should accidentally leak from the tank, as by a loose or failing connection or crack in the tank, it will be appreciated that as the water level lowers in the tank without actuation of the flush control lever (not shown), the catch 55 will remain in the catch position shown in FIG. 8, thus blocking the control tube 51 from lowering below the position shown. This then serves to prevent such control tube from lowering the free extremity 43 of the lever arm 42 (FIG. 6) thus leaving the valve poppet off its seat and the top side of the diaphragm 20 pressurized to maintain the diaphragm on its seat 19 to block inflow of water from the upper inlet tube 87.

Consequently, the total loss of water will be only that which is stored in the tank 71 and inflow of additional water from the upper inlet tube 87 will be blocked until such time as the homeowner or attendant note that the tank 71 has been evacuated without refill. This then alerts the homeowner of the leak thus allowing for repair work before the tank 71 is again filled with water.

With continued reference to FIG. 7, when the poppet is closed it will thus be appreciated that water flowing upwardly from the upper inlet tube 87 it will strike the facing conical surface of the poppet 41 to be diverted radially, outwardly, and downwardly as indicated by directional arrows 201 to the outlets 166 to be defined by annular deflectors 85.

Referring to FIG. 6, when the poppet is open the incoming water will be directed to flow outwardly around the conical surface of the poppet to flow upwardly in the passage 26, through the annuli formed with the respective ports 27 and 29, via the grooves in the flutes of the enlarged sections 33 and 35 (FIG. 6). Flow will continue on upwardly in the tower to flow outwardly in the bleed ports 115 (FIG. 7) to maintain a positive pressure differential acting down on the top of the diaphragm 20. The control valve will thus remain closed until such time as the float and control tube are lowered as by a toilet flush.

It will be appreciated that as the float carries the control tube 51 up, the lower edge of such tube will be raised above the level of the keeper 61 to free the catch to be rotated clockwise under the influence of the elastomeric hinge arm 59 to the position shown in FIG. 8 disposed under the bottom edge of such tube.

Then, when the flush handle is operated to flush the toilet, the outlet valve 53 (FIG. 1) will be opened and the link 65 drawn to the right as viewed in FIG. 9 to rotate the catch device 55 counter clockwise about the point defined by the hinge arm 59 to drive the upper end of such catch device 55 to the left to strike the stop 158 as the keeper 61 is likewise shifted to the left from under the edge of the tube 51 freeing such tube to lower. This then serves to lower the free end 43 of the lever 42 (FIG. 7) to raise the poppet 41 to discontinue bleed of fluid up the passage 26 and pressurize the underside of the diaphragm to raise such diaphragm off its seat. This then allows for pressurized water to flow out of the upper inlet tube 87 and flow radially outwardly and down through the ports 166 as depicted by the directional arrows (FIG. 7) to again fill the tank.

As will be appreciated by those of skill, for different types of water tanks 71, such as the ever-popular low profile tanks, the vertical adjustment of the inlet pipe device 15 will be made to establish the desired level of water in the tank. Thus, for a low profile tank, the male inlet pipe 141 may easily be telescoped downwardly into the lower master pipe 131 as the ribs 139 flexibly pass the ribs 137 until the desired height of the inlet device is established thereby positioning the float 47 at the desired level for causing the control tube 51 to actuate the control lever 42 at the desired water level.

In that regard, the reader will understand that when the inlet pipe device is telescoped down, it is possible to slide the slider 187 down a corresponding amount on the catch device 55 to thus coordinate actuation of and blocking in accordance with the desired height of the water in the tank 71.

Figure 11:
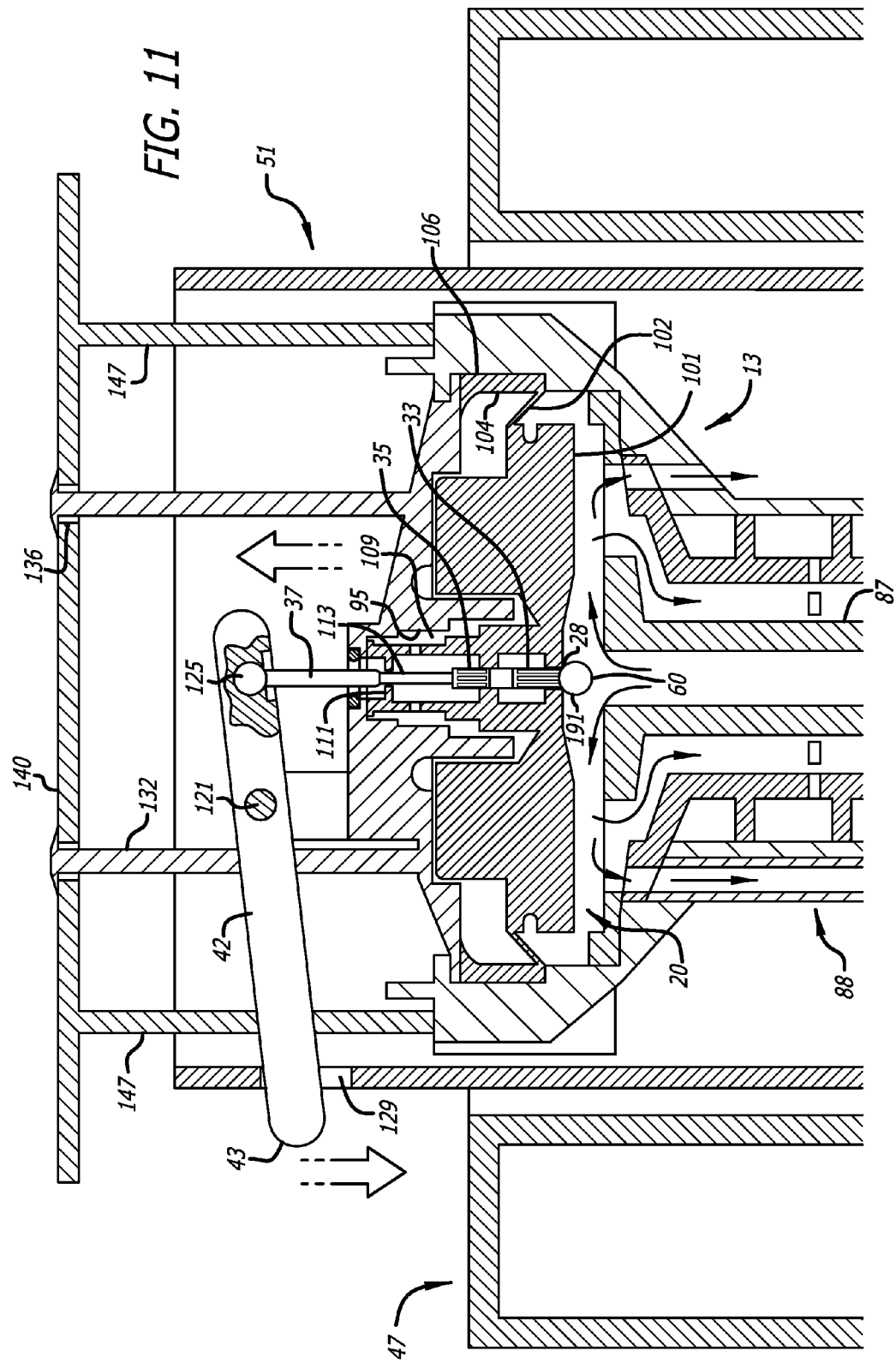
FIG. 11 is vertical, sectional view, partially broken away, of a second embodiment of the flow control device shown in FIG. 2.

The embodiment of the present invention shown in FIG. 11 is similar to that shown in FIG. 7 except that the pilot stem 37 is configured at its lower extremity with an enlarged poppet in the form of a spherical poppet 191 configured to seat upwardly on the downwardly facing pilot seat 28.

Figure 17:
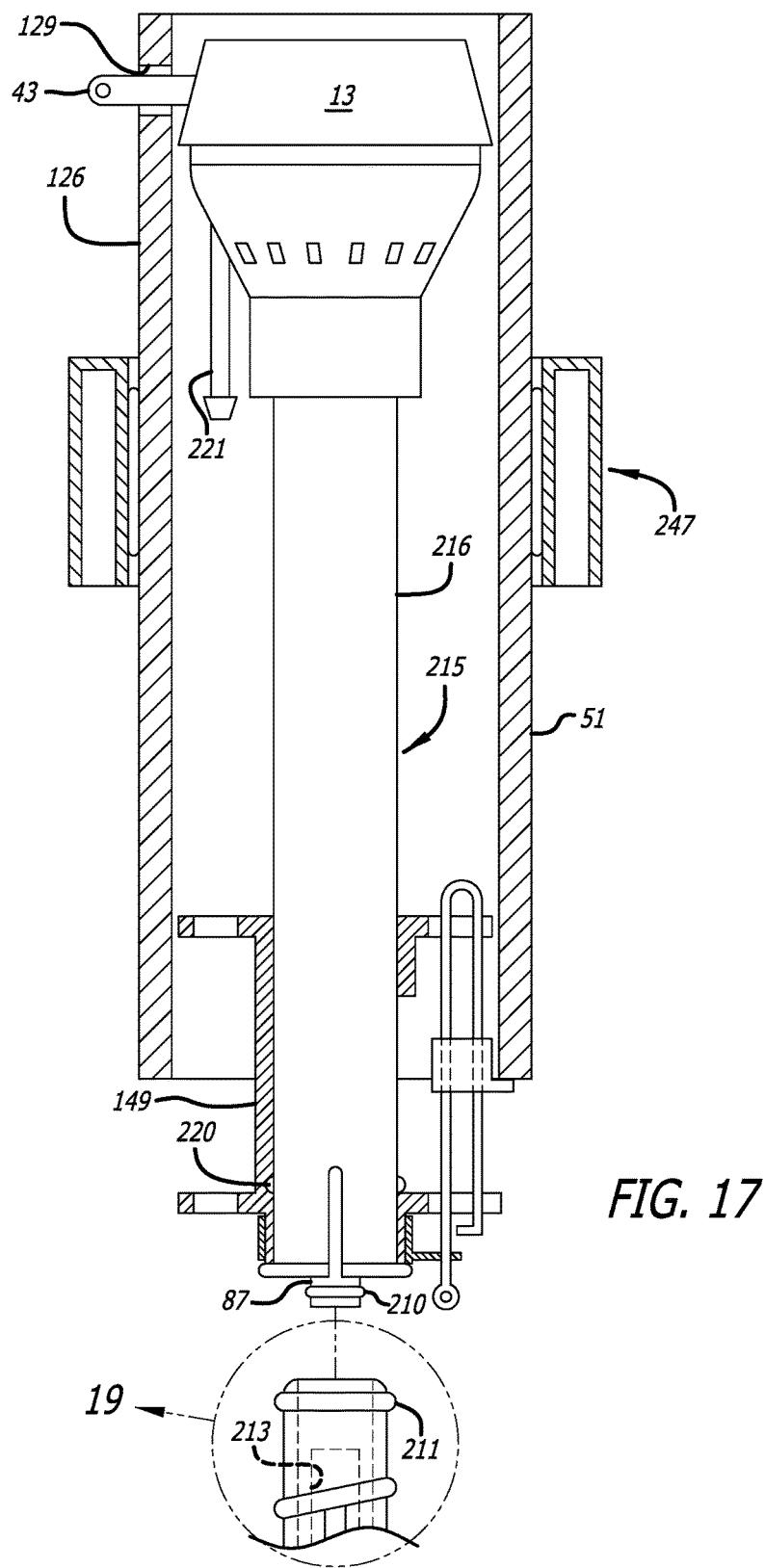
FIG. 17 is a vertical view, partially in section, of the control tube and stein of FIGS. 15 and 16 being assembled.
Figures 18A, 18B:
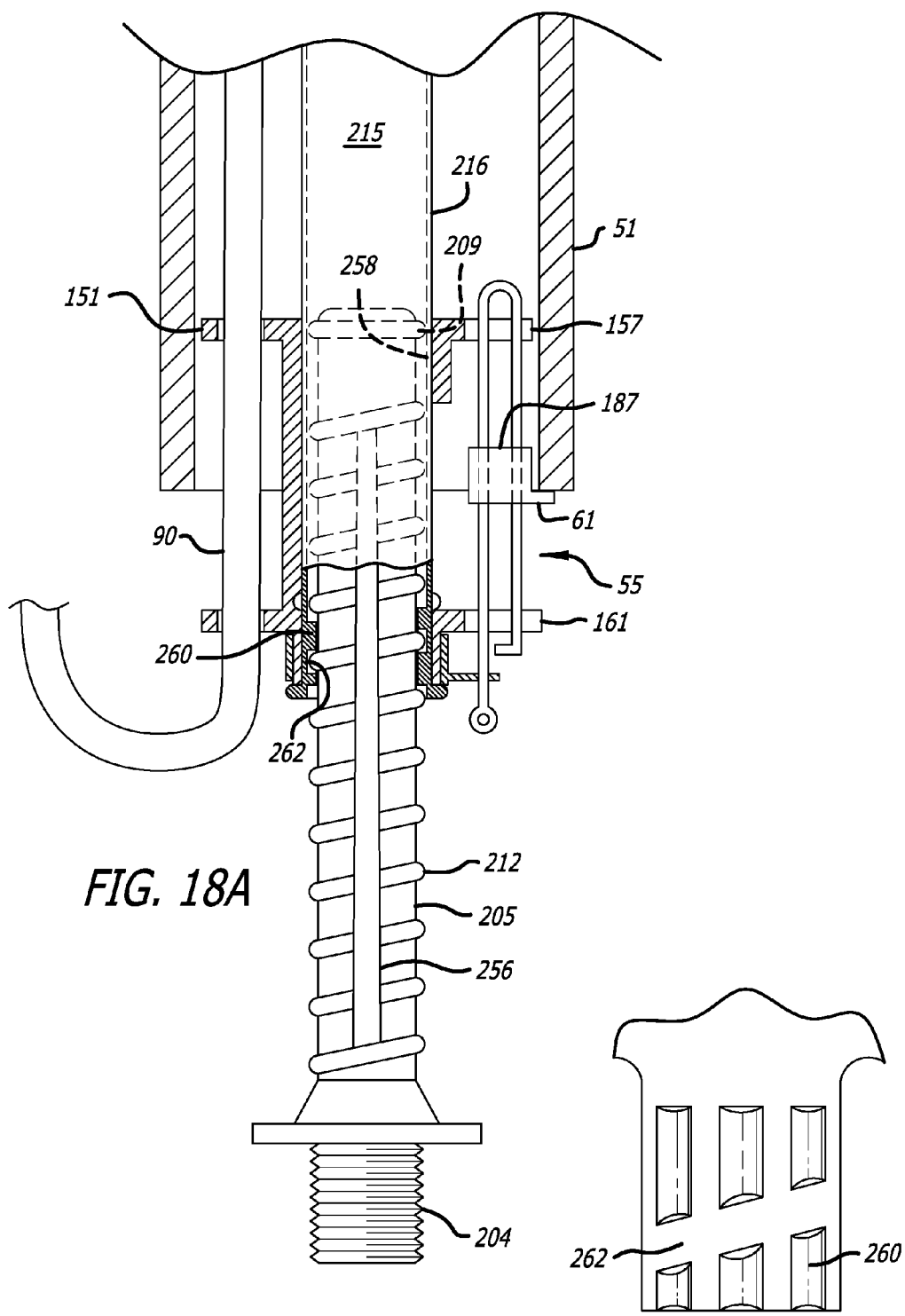
FIG. 18A is a vertical view, partially in section, similar to FIG. 17 but showing the components assembled.
FIG. 18B is a partial sectional view in enlarged scale showing screw thread segments on the interior surface of pipe fingers shown in FIG. 18.
Figure 19:
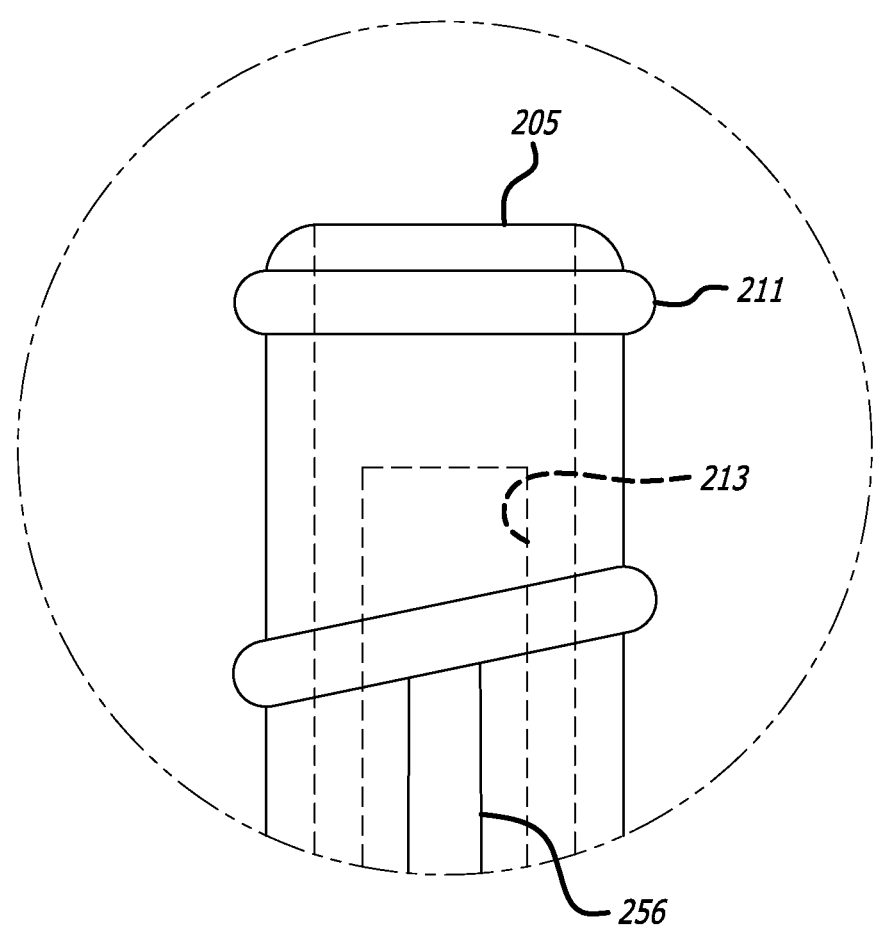
FIG. 19 is a detail view in enlarged scale taken from the circle 19 in FIG. 17.

Referring to FIGS. 12-18 showing a further embodiment of the present invention, I provide a valve assembly which may be in the form of a retrofit valve adapter to be mounted to a conventional threaded, hollow, upwardly opening mounting tube device 201 (FIGS. 15 and 17) formed with at its lower extremity with a threaded mounting fitting 204 to connect through the bottom wall of a toilet tank. The tube device 201 forms an upstanding tubular stem 205 having an exterior cylindrical wall configured with course male screw threads 212 and terminating in a top extremity 207. In the preferred embodiment the screw threads are formed with about one half to two threads per inch, and preferably one. In some embodiments the threads are formed in segments. Formed concentric with the stem 205 is an upstanding inlet tube 213 supported at its bottom end from the stem by an annular web 214 (FIG. 15) and terminating in a top end 219. The tube 213 and stem cooperate to form an annulus 226. The extremity 207 is formed with an exterior O-ring gland 209 of receipt of a stabilizing O-ring 211 (FIG. 17). The stem may be formed with one or more narrow longitudinal ribs 256.

Referring to FIGS. 16-22, a master control pipe device, generally designated 215, is telescoped downwardly over the stem 205 and includes a female outer pipe 216 concentric about an inner, inlet pipe 87 formed with an interior cylindrical surface 258 (FIG. 18). The inlet pipe is formed on its lower extremity with a pair of annular glands receiving O-rings 210. The pipe 216 is formed on its lower extremity with downwardly opening vertical slits 217 spaced thereabout to form therebetween resilient, cantilever, gripping fingers 222 which may be flexed inwardly on their lower extremities to grip the stem 205. As is known in other combinations in the art, one or more of the fingers 222 may be configured on their interior surfaces with vertical ribs formed centrally with radially inwardly opening notches 262 to form female thread segments for receipt of the male threads 212. In a preferred embodiment the ribs 260 are arrayed about the interior of the pipe 215 toward the lower extremities of the fingers 222 with the notches 262 arranged in a spiral pattern complementing the spiral patter of the threads 212 formed on a conventional stem. The outer pipe 216 is also formed near its lower extremity with small radially outwardly projecting locking buttons 220 (FIG. 14) spaced equidistant and is formed at its bottom extremity with an exterior flange 218.

Mounted at the upper extremity of the pipe device 215 (FIG. 14) is a control valve 13 similar to that shown in FIGS. 2 and 4 which suspends the inlet pipe 87 telescoped into the pipe 216 to cooperate therewith to form an annulus for receipt of the stem 205. The control valve includes a downwardly projecting refill nipple 221 (FIG. 16) spaced diametrically to one side.

Figure 12:
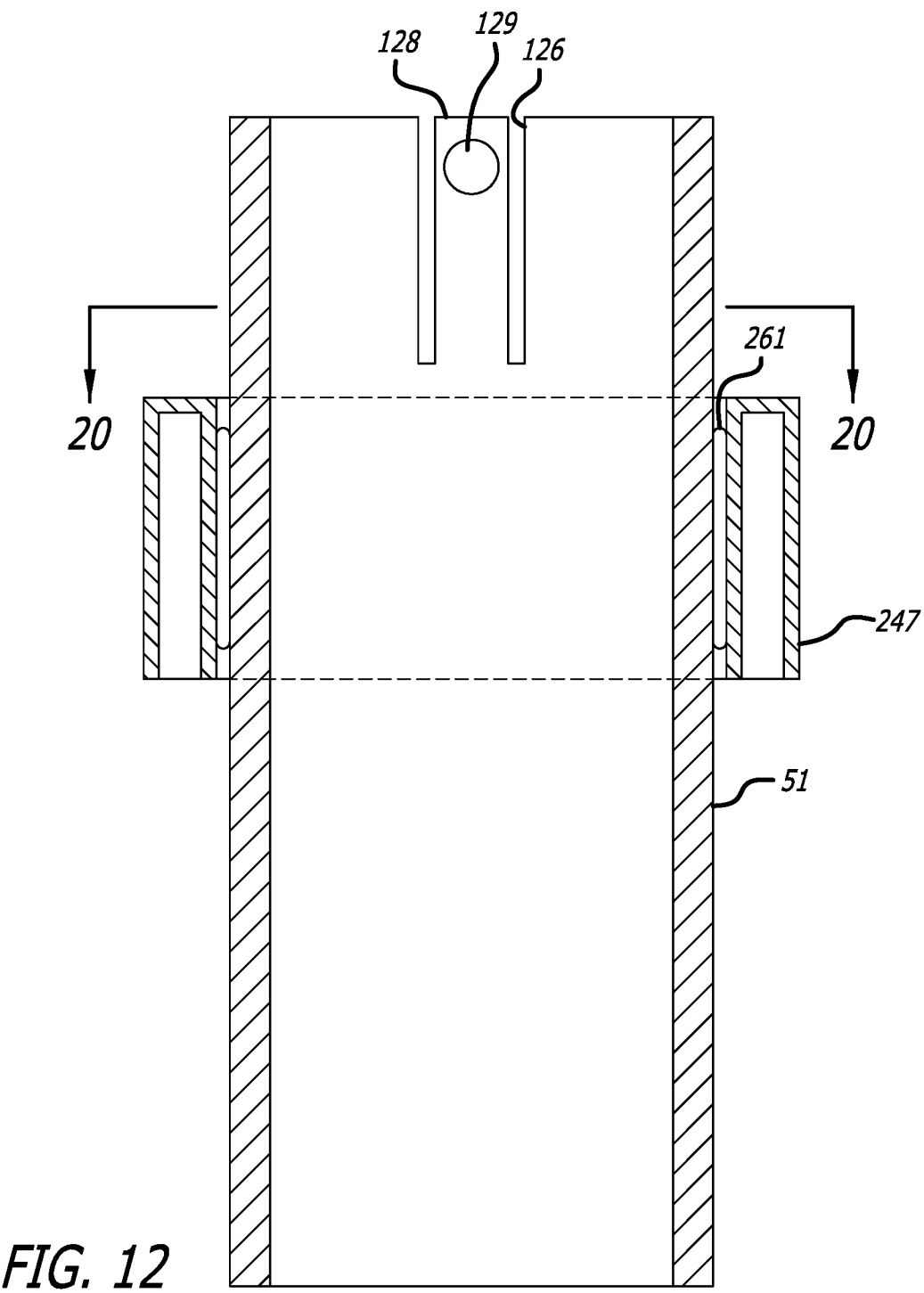
FIG. 12 is a vertical, sectional view of a master tube device and float incorporated in a further embodiment of the present invention.

Referring to FIGS. 12 and 17, telescoped over the pipe 216 is a large diameter control tube 51 which is encircled by an eccentrically shaped float 247 for controlled vertical and rotational travel therealong.

Figure 20:
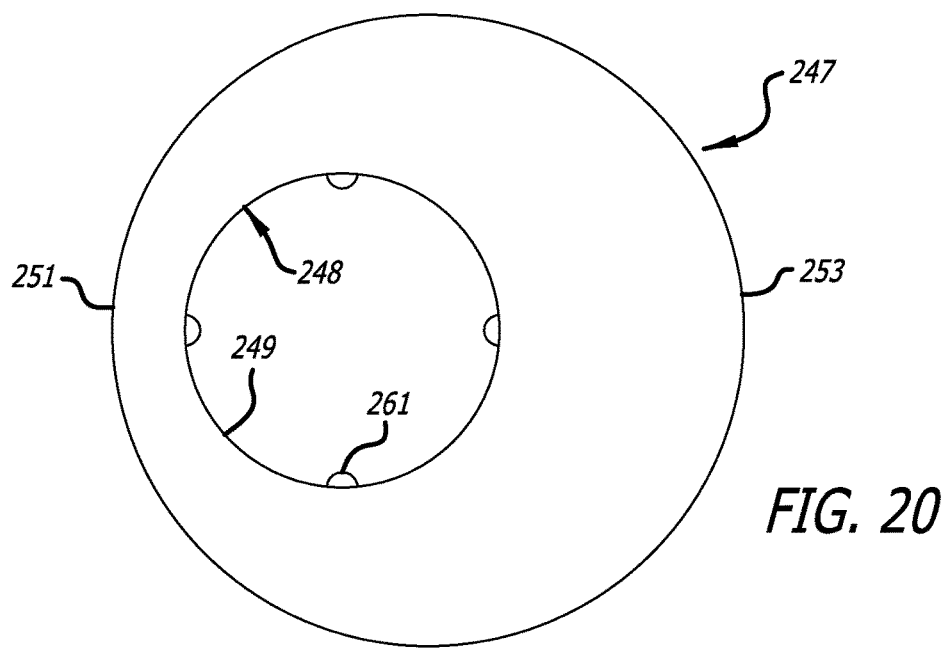
FIG. 20 is a transverse sectional view taken from the line 22 in FIG. 12.
Figure 21:
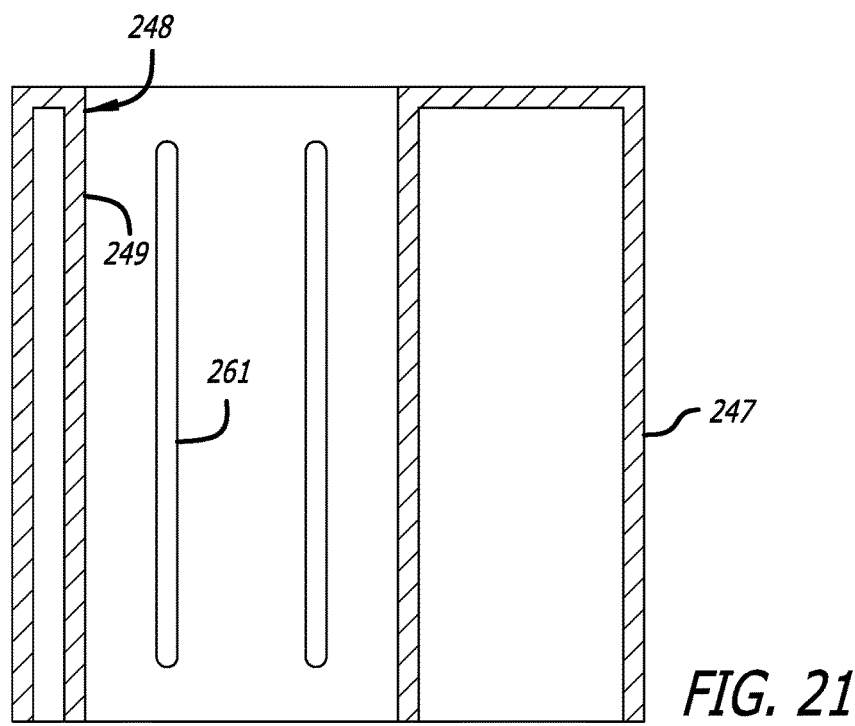
FIG. 21 is a sectional view of the float shown in FIG. 20.
Figure 22:
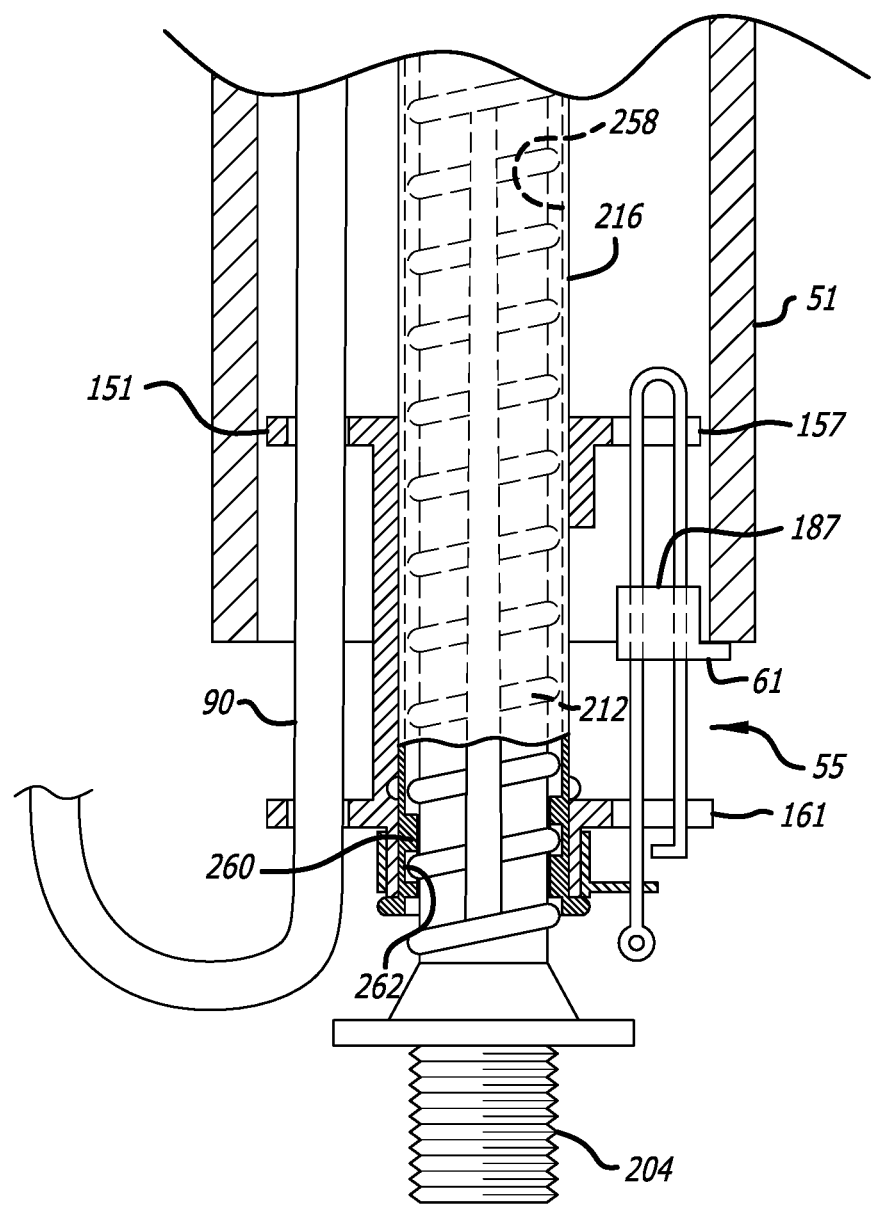
FIG. 22 is a detailed view of the parts shown in FIG. 17 assembled.

Referring to FIGS. 20-22, in top plan view the float 247 is eccentrically shaped to form a cylindrical central wall 248 defining a through-opening 249 in a float body configured on one diametrical side with a narrow ring segment 251 and on the opposite diametrical side with a wide ring segment defining a lobe 253, the segments configured with closed top and side walls to form a downwardly opening chamber to capture air for buoyancy. Formed on the radially inner surface of the cylindrical wall are a plurality of vertically elongated resilient friction bars 261 spaced circumferentially thereabout and sized to cooperate in acting as frictional brakes against the exterior wall of the control tube 51. Thus, the float may be shifted vertically on such control tube and also rotated horizontally to adjust for water level in the tank and also to dispose the enlarged lobe 253 in the desired radial position to, for instance, clear the inside corner or wall of any tanks where the stem is mounted in close spaced relationship to such corner or wall.

Figure 1A:
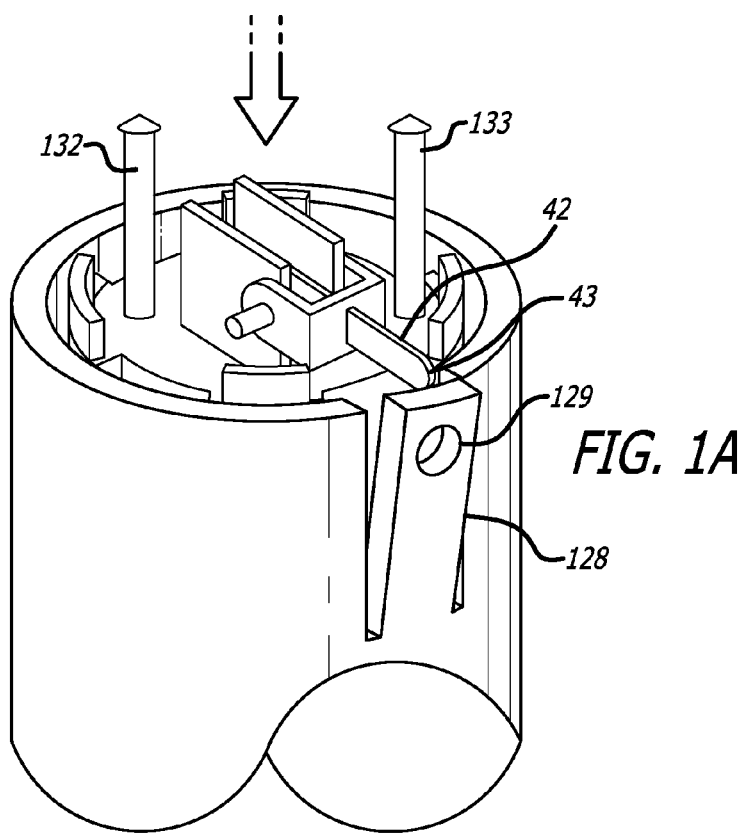
Figure 1B:
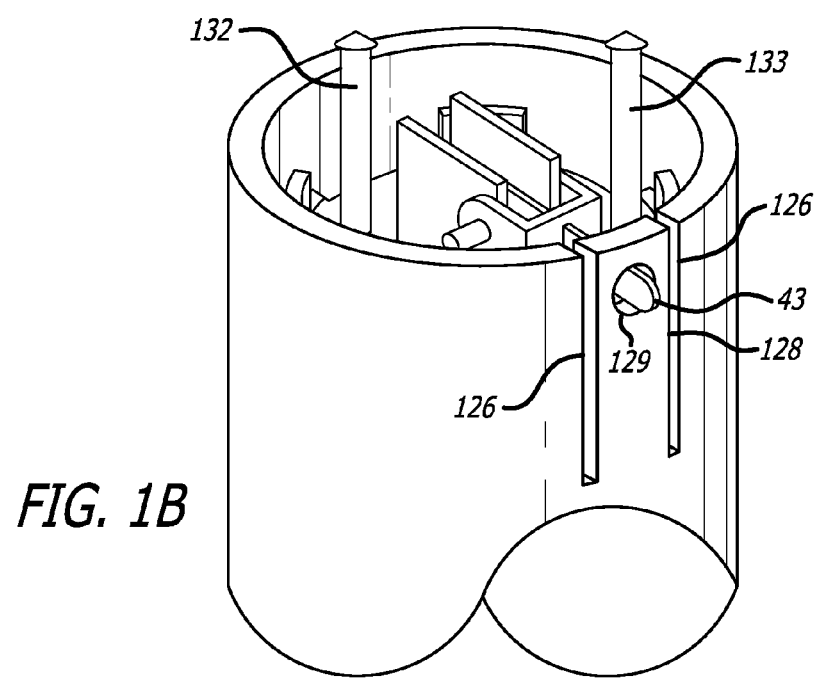

The control tube is formed at its upper extremity with circumferentially spaced apart slits 126 to form therebetween a flexible tongue 128, having a bore 129 formed in the upper extremities thereof. The tongue is constructed to flex outwardly at its upper extremity during assembly for receipt of the lever arm 43 as shown in FIGS. 1a and 1b.

Figure 13:
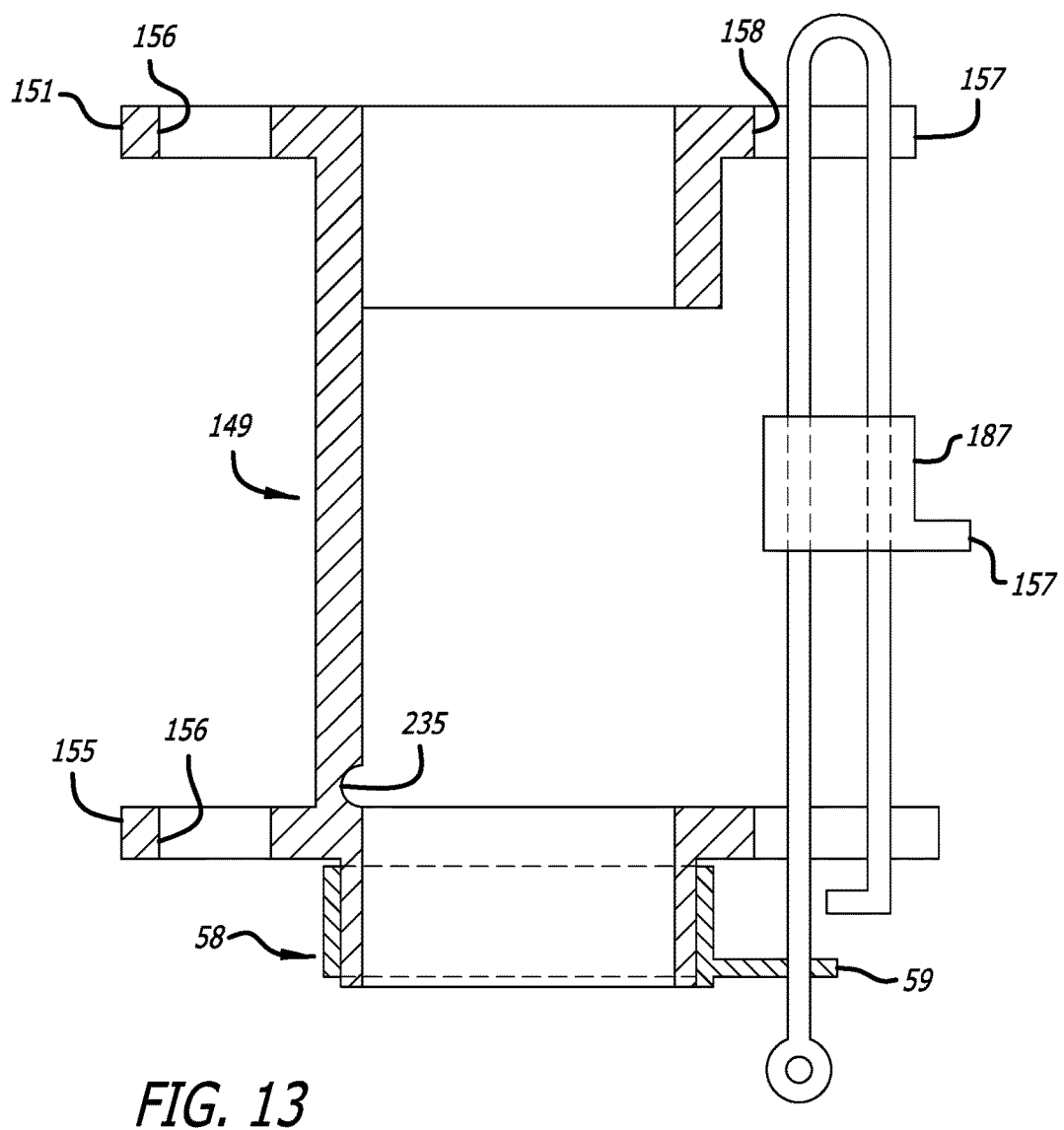
FIG. 13 is a vertical, sectional view of a mounting fitting employed with the further embodiment.
Figure 14:
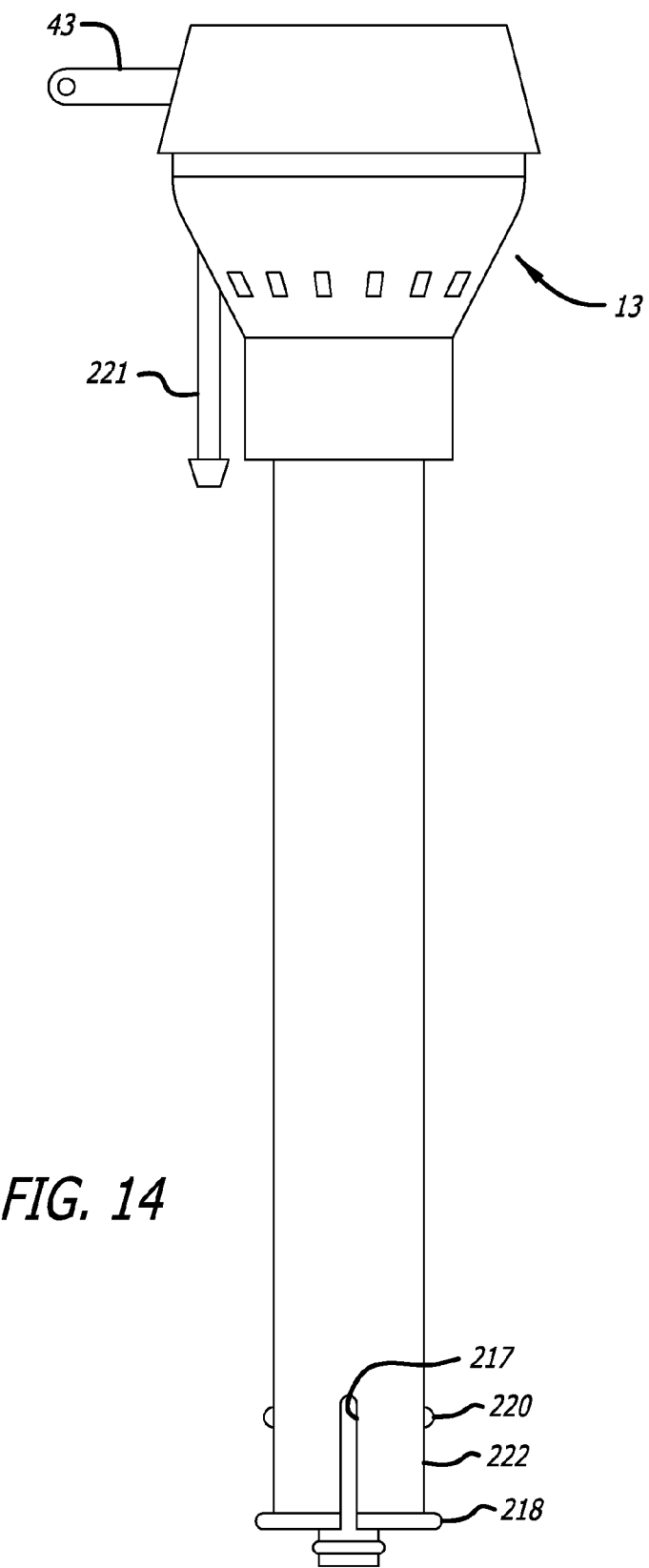
FIG. 14 is a vertical side view, in reduced scale, of a master control tube incorporated in this further embodiment.
Figure 15:
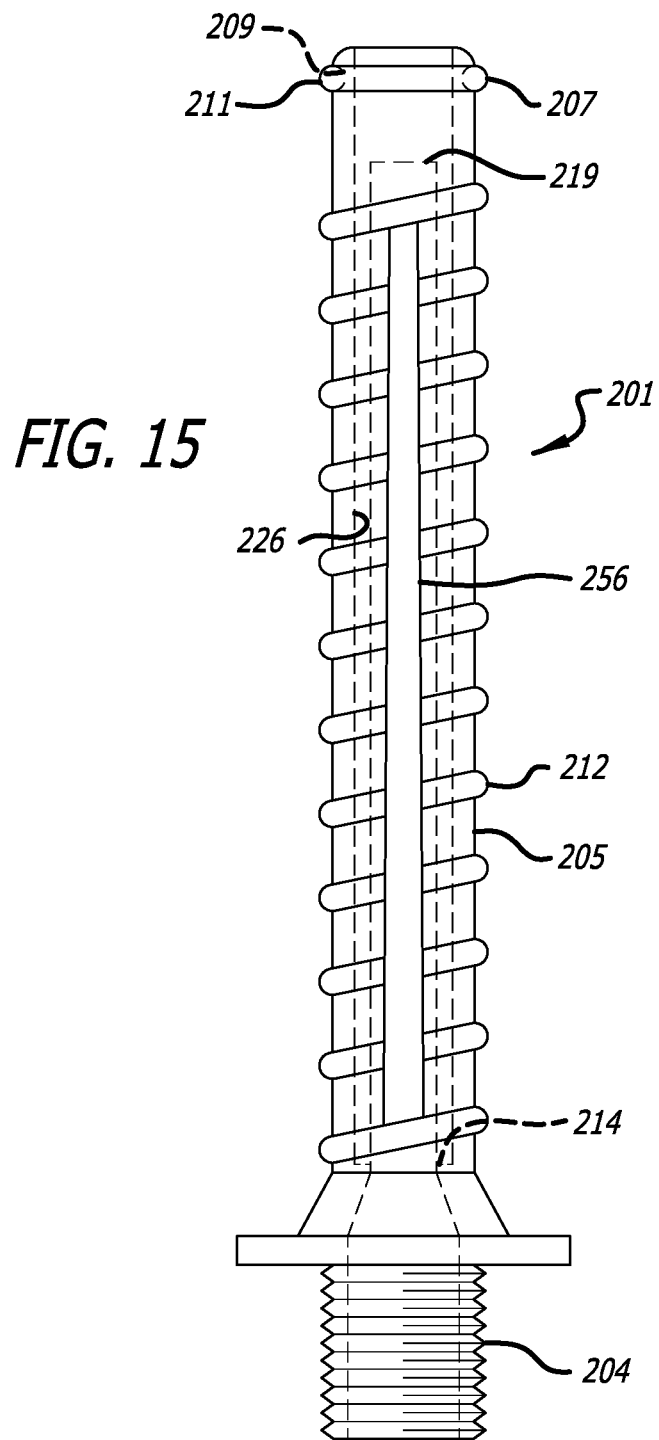
FIG. 15 is a vertical view of a conventional upright stem to receive the master control tube device of this further embodiment.
Figure 16:
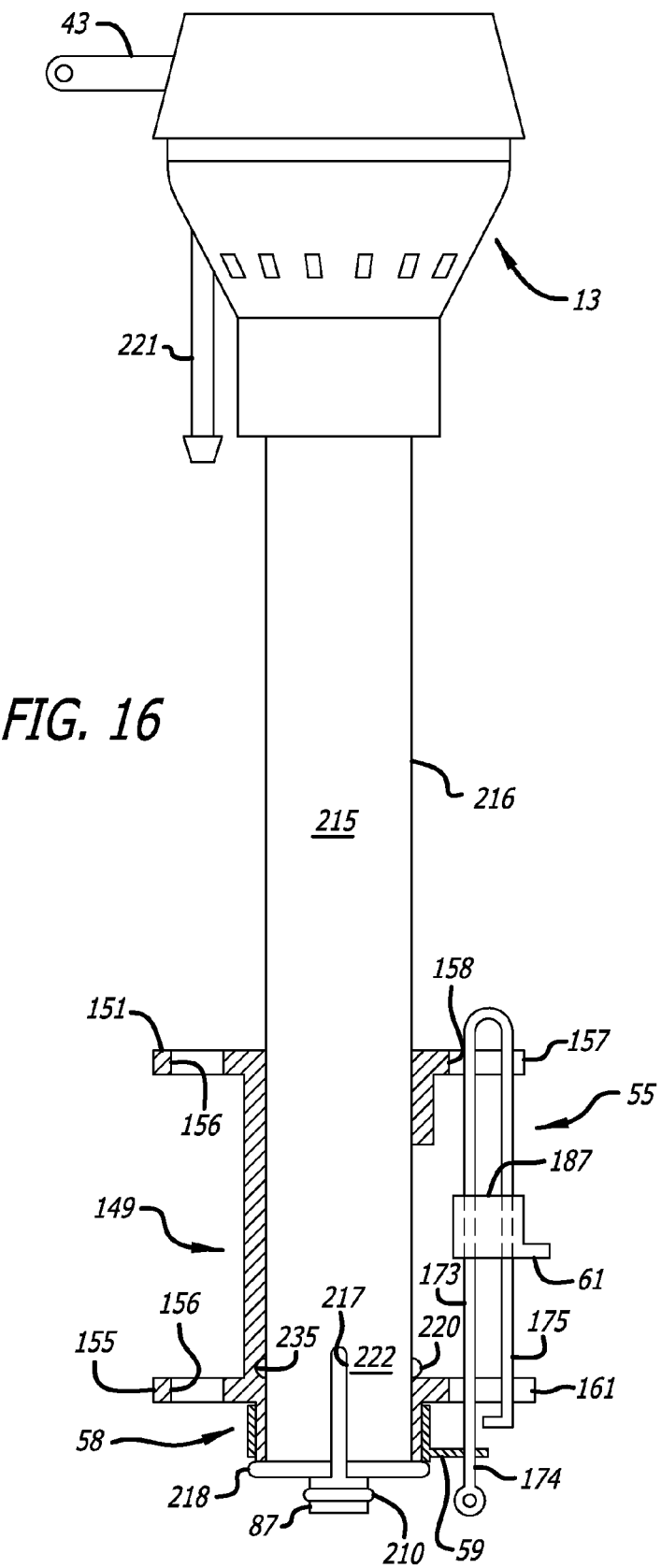
FIG. 16 is a vertical view, partially in section, of the pipe device and mounting fitting of FIGS. 13 and 14.

Referring to FIGS. 13 and 17, received telescopically on the lower extremity of the pipe 216 is the spool shaped lock fitting 149 (FIG. 8) configured with a tubular element formed on its inner wall with an annular, radially inwardly opening snap-lock groove 235 for selective engagement with the lock buttons 220 (FIG. 17). As above, the flanges 151 and 155 are formed with bores 156 spaced annularly thereabout or, in some embodiments, are in the form of arcuate slats.

As will be appreciated by those of skill in the art, the stem 205 is of the type normally incorporated in a popular model as sold by FLUID MASTER® and is often installed as original or replacement equipment. One advantage of my invention is that in addition to being adapted for installation as original equipment, it can be utilized for rapid and convenient exchange-out of a new valve and control to replace the FLUID MASTER® valve components.

In this regard, in replacing the control valve, the workmen may remove the worn components, leaving the stem 205 in the toilet tank. The lock fitting 149 will have been telescoped onto the pipe 216 either from the top end or by flexing the bottom extremities of the fingers 222 radially inwardly so the segments of the flange 218 clear the fingers and the fitting 149 telescoped up on the pipe 216 above the buttons 220 to allow the lower extremities of such fingers to flex back radially inwardly so the pipe 216 will be free to telescope over the stem 205 up past the buttons 220. The pipe 216 may then be telescoped down over the stem 205 to drive the fill pipe 87 downwardly to telescope into the interior of tube 213 and within the annulus 226. The pipe 216 may be adjusted to the critical level to position with the top end about one inch above the horizontal plane of the top of the overflow pipe 72 (FIG. 1). As will be appreciated by those skilled in the art, this vertical adjustment may be achieved by initially forcing the pipe 216 downwardly on the stem 205 causing the ribs 260 (FIGS. 18A, 18B and 22) on the interior of the lower extremities of the fingers 222 to ride over the threads 212 until the approximate desired level for 216 is achieved, leaving the notches 262 engaged over the thread 212. Further vertical adjustment may be achieved by rotating the pipe 216 to further advance the pipe 216 downwardly as dictated by the thread 212 in the notches 262. The fitting 149 may then be rotated on the pipe to the desired rotational position and slid down on the pipe 216 to drive the fingers 222 radially inwardly to grip the stem 205 and threads 212 and engage the groove 235 with the buttons 220 to hold the pipe 216 at the adjusted height and with the desired gripping force.

The fill tube 90 may then be telescoped on one end over the nipple 221 and the body thereof threaded through the bores 156 or any corresponding arcuate slots. As above, the tube 51 may be positioned on the stem 205 so that once the pipe 216 is fitted down on the stem, the tube 51 may be slid upwardly. It will be appreciated that the fill tube 87 is received in the tube 213 so the O-ring or O-rings will make a water-tight seal. The control tube 51 may then be adjusted upwardly to engage the top end of the tongue 128 with the rounded end of the central lever 43 (FIG. 17) such that further upward travel of the tube will drive the top end of such tongue radially outwardly so that, when the bore 129 registers with the lever, such tongue will snap back radially inwardly to couple with the lever. As a final adjustment, the float 247 may be slid up or down against the friction of the ribs 261 to the desired elevation on the control tube 51 to maintain the desired water level in the tank after each flush.

As will be apparent to those skilled in the art, the workman or do-it-yourselfer may alter the sequence of assembly as desired.

From the foregoing it will be appreciated that the valve control device of the present invention is made up of a minimal number of parts, making it economical to manufacture and convenient to install on a conventional stem to provide an effective means for controlling flow of water from an inlet pipe.

Although the present invention has been described in detail with regard to the preferred embodiments and drawings thereof, it should be apparent to those of ordinary skill in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention.

I claim:

1. A retrofit hydraulic valve apparatus for mounting on a hollow upwardly opening stem disposed adjacent a flush control device of a toilet tank inlet comprising:
   a master pipe device including concentric inner and outer pipes cooperating to form a downwardly opening annulus to receive the stem, the outer pipe formed on its lower extremity with a plurality of flexible fingers having lower extremities to be flexed inwardly and outwardly;
   the upwardly opening stem formed with screw threads in the form of a spiral configured in a selected pattern having a predetermined number of threads per linear measurement;
   at least one of the fingers configured on its interior with a rib formed with an inwardly opening notch to receive the threads;
   a flow control device including a flow control valve mounted on the master pipe for receiving flow from the inner pipe to control flow to the toilet tank;
   a ring-shaped locking device received over the outer pipe to slide vertically thereon and constructed to be slid downwardly to a locking position pressing the lower extremities of the fingers inwardly to grip the stem; and
   a keeper device coupled with the flush control device operative to, without actuation of the flush device, maintain the flow control valve closed.

2. The apparatus of claim 1 that includes:
   a float apparatus coupled with the flow control valve and configured to travel along a predetermined path to lower and raise with the level of fluid in the toilet tank;
   a catch device including a vertically elongated stiff wire disposed on one side of the pipe device for rotating between catch and release positions;
   a mounting device for mounting the catch device from the pipe device for rotation between the catch and release positions;
   the keeper device being mounted on the wire to be, when the catch device is in the catch position, disposed in the predetermined path to block lowering of the float apparatus; and
   a connector connecting the lower extremity of the wire with the flush device to, upon the flush device being shifted to the flush position, rotate the catch device to the release position.

3. The toilet fluid control apparatus of claim 2 wherein:
   the catch device includes a linear arm carried medially from the mounting device to project vertically below the mounting device to form a vertical lever arm connected with the control device.

4. The toilet fluid control apparatus of claim 2 wherein:
   the float apparatus is cylindrically shaped, is disposed about the pipe device and is formed to cooperate with the pipe device to form a downwardly opening annulus and a downwardly facing edge; and the catch device is configured to project vertically upwardly into the annulus and is further configured so that, when the control device is actuated, the keeper will be carried radially from beneath the edge toward the pipe device.

5. The toilet fluid control apparatus of claim 2 wherein:

the wire is hairpin shaped, formed with co-extensive first and second legs disposed vertically alongside the pipe device;

the mounting device mounts the catch device medially from the pipe device with the first leg projecting there below and attached to the control device; and the keeper is mounted to the catch device for shifting vertically relative to the pipe device.

6. The toilet fluid control apparatus of claim 2 wherein:

the mounting device is spool shaped and configured with upper and lower flanges, the flanges formed vertically aligned bores on one diametrical side for receipt of a fill tube constructed with the valve and including a ring formed with a mounting arm projecting radially to the side of the mounting device opposite the one diametrical side and mounting the catch device.

\* \* \* \* \*